(12) United States Patent
Appelman et al.

(10) Patent No.: US 8,635,273 B2
(45) Date of Patent: Jan. 21, 2014

(54) ANNOUNCING NEW USERS OF AN ELECTRONIC COMMUNICATIONS SYSTEM TO EXISTING USERS

(75) Inventors: Barry Appelman, McLean, VA (US); Edmund J. Fish, Great Falls, VA (US)

(73) Assignee: AOL Inc., Dulles, VA (US)

( * ) Notice: Subject to any disclaimer, the term of this patent is extended or adjusted under 35 U.S.C. 154(b) by 3243 days.

(21) Appl. No.: 11/015,476

(22) Filed: Dec. 20, 2004

(65) Prior Publication Data

US 2007/0250566 A1   Oct. 25, 2007

Related U.S. Application Data

(60) Provisional application No. 60/549,937, filed on Mar. 5, 2004, provisional application No. 60/552,718, filed on Mar. 15, 2004.

(51) Int. Cl.
   *G06F 15/16* (2006.01)
(52) U.S. Cl.
   USPC ............ 709/204; 709/205; 709/206; 709/207
(58) Field of Classification Search
   USPC .................................................. 709/204–207
   See application file for complete search history.

(56) References Cited

U.S. PATENT DOCUMENTS

| | | |
|---|---|---|
| 5,086,394 A | 2/1992 | Shapira |
| 5,276,905 A | 1/1994 | Hurst |
| 5,548,637 A | 8/1996 | Heller et al. |
| 5,694,616 A | 12/1997 | Johnson |
| 5,793,365 A | 8/1998 | Tang |
| 5,802,470 A | 9/1998 | Gaulke |
| 5,867,162 A | 2/1999 | O'Leary |
| 5,940,488 A | 8/1999 | DeGrazia |
| 5,946,617 A | 8/1999 | Portaro |
| 5,987,113 A | 11/1999 | James |
| 6,049,533 A | 4/2000 | Norman |
| 6,065,047 A | 5/2000 | Carpenter |
| 6,073,138 A | 6/2000 | de l'Etraz et al. |

(Continued)

FOREIGN PATENT DOCUMENTS

| | | |
|---|---|---|
| GB | 2357932 | 7/2001 |
| GB | 2368747 | 5/2002 |

(Continued)

OTHER PUBLICATIONS

The International Search Report, Application Serial No. PCT/US05/08476, dated Oct. 16, 2006, 9 pages.

(Continued)

*Primary Examiner* — Umar Cheema
(74) *Attorney, Agent, or Firm* — Bookoff McAndrews, PLLC

(57) ABSTRACT

Announcing new users of an electronic communications system includes receiving an indication of a new user of an electronic communications system. The new user has an identifier for the electronic communications system. Existing users of the electronic communications system that are known to the new user are identified. The identified existing users are sent a message notifying the identified existing users of the identifier of the new user. The identified existing users may be enabled to add the identifier of the new user to participant lists used by the identified existing users. The new user may be enabled to add identifiers of the identified existing users to a participant list of the electronic communications system used by the new user.

27 Claims, 12 Drawing Sheets

(56) References Cited

U.S. PATENT DOCUMENTS

| | | |
|---|---|---|
| 6,088,435 A | 7/2000 | Barber et al. |
| 6,112,181 A | 8/2000 | Shear et al. |
| 6,161,130 A | 12/2000 | Horvitz et al. |
| 6,175,831 B1 | 1/2001 | Weinreich et al. |
| 6,199,103 B1 | 3/2001 | Sakaguchi et al. |
| 6,247,043 B1* | 6/2001 | Bates et al. ............. 709/200 |
| 6,269,369 B1 | 7/2001 | Robertson |
| 6,311,211 B1 | 10/2001 | Shaw |
| 6,324,541 B1 | 11/2001 | de l'Etraz et al. |
| 6,330,590 B1 | 12/2001 | Cotten |
| 6,347,332 B1 | 2/2002 | Malet et al. |
| 6,374,246 B1 | 4/2002 | Matsuo |
| 6,374,290 B1 | 4/2002 | Scharber et al. |
| 6,389,372 B1 | 5/2002 | Glance et al. |
| 6,415,318 B1 | 7/2002 | Aggarwal |
| 6,421,439 B1 | 7/2002 | Liffick |
| 6,421,675 B1 | 7/2002 | Ryan |
| 6,421,709 B1 | 7/2002 | McCormick et al. |
| 6,430,604 B1 | 8/2002 | Ogle |
| 6,449,634 B1 | 9/2002 | Capiel |
| 6,480,885 B1 | 11/2002 | Olivier |
| 6,507,866 B1 | 1/2003 | Barchi |
| 6,549,937 B1 | 4/2003 | Auerbach et al. |
| 6,571,234 B1 | 5/2003 | Knight et al. |
| 6,615,241 B1 | 9/2003 | Miller et al. |
| 6,640,218 B1 | 10/2003 | Golding |
| 6,647,383 B1 | 11/2003 | August |
| 6,677,968 B1 | 1/2004 | Appelman |
| 6,678,719 B1 | 1/2004 | Stimmel |
| 6,697,807 B2 | 2/2004 | McGeachie |
| 6,714,793 B1 | 3/2004 | Carey |
| 6,731,308 B1 | 5/2004 | Tang |
| 6,732,155 B2 | 5/2004 | Meek |
| 6,750,881 B1 | 6/2004 | Appelman |
| 6,772,188 B1 | 8/2004 | Cloutier |
| 6,785,554 B1 | 8/2004 | Amerga |
| 6,788,769 B1 | 9/2004 | Waites |
| 6,799,039 B2 | 9/2004 | Wu |
| 6,800,031 B2 | 10/2004 | Di Cesare |
| 6,832,245 B1 | 12/2004 | Isaacs |
| 6,901,559 B1 | 5/2005 | Blum |
| 6,904,026 B1 | 6/2005 | Tarnanen |
| 6,907,243 B1 | 6/2005 | Patel |
| 6,912,563 B1 | 6/2005 | Parker |
| 6,917,965 B2 | 7/2005 | Gupta |
| 7,039,639 B2 | 5/2006 | Brezin |
| 7,058,036 B1 | 6/2006 | Yu |
| 7,117,254 B2 | 10/2006 | Lunt |
| 7,124,123 B1 | 10/2006 | Roskind |
| 7,127,232 B2 | 10/2006 | O'Neil |
| 7,177,880 B2 | 2/2007 | Ruvolo |
| 7,181,498 B2 | 2/2007 | Zhu |
| 7,188,153 B2 | 3/2007 | Lunt |
| 7,190,956 B2 | 3/2007 | Dorenbosch |
| 7,269,590 B2 | 9/2007 | Hull |
| 7,313,760 B2 | 12/2007 | Grossman |
| 2001/0005861 A1 | 6/2001 | Mousseau |
| 2002/0065856 A1 | 5/2002 | Kisiel |
| 2002/0065894 A1 | 5/2002 | Dalal |
| 2002/0083136 A1 | 6/2002 | Whitten, II |
| 2002/0091667 A1 | 7/2002 | Jaipuria |
| 2002/0103801 A1 | 8/2002 | Lyons |
| 2002/0112181 A1 | 8/2002 | Smith |
| 2002/0116463 A1 | 8/2002 | Hart |
| 2002/0116641 A1 | 8/2002 | Mastrianni |
| 2002/0133369 A1 | 9/2002 | Johnson |
| 2002/0175953 A1 | 11/2002 | Lin |
| 2002/0178161 A1* | 11/2002 | Brezin et al. ............. 707/10 |
| 2002/0181703 A1 | 12/2002 | Logan et al. |
| 2002/0184089 A1 | 12/2002 | Tsou |
| 2002/0199095 A1 | 12/2002 | Bandini et al. |
| 2003/0004855 A1 | 1/2003 | Dutta et al. |
| 2003/0004872 A1 | 1/2003 | Gardi |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0050916 A1 | 3/2003 | Ortega et al. |
| 2003/0055831 A1 | 3/2003 | Ryan |
| 2003/0065721 A1 | 4/2003 | Roskind |
| 2003/0088554 A1 | 5/2003 | Ryan |
| 2003/0101226 A1* | 5/2003 | Quine ............. 709/206 |
| 2003/0105822 A1 | 6/2003 | Gusler et al. |
| 2003/0131061 A1 | 7/2003 | Newton et al. |
| 2003/0167324 A1 | 9/2003 | Farnham |
| 2003/0172349 A1 | 9/2003 | Katayama |
| 2003/0187813 A1 | 10/2003 | Goldman |
| 2004/0054736 A1* | 3/2004 | Daniell et al. ............. 709/206 |
| 2004/0056901 A1 | 3/2004 | March |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0179039 A1 | 9/2004 | Blattner |
| 2004/0186738 A1 | 9/2004 | Reisman |
| 2004/0201624 A1 | 10/2004 | Crawford |
| 2004/0210844 A1 | 10/2004 | Pettinati et al. |
| 2004/0215648 A1 | 10/2004 | Marshall |
| 2004/0215721 A1 | 10/2004 | Szeto |
| 2004/0215793 A1 | 10/2004 | Ryan |
| 2004/0221309 A1 | 11/2004 | Zaner |
| 2005/0015432 A1 | 1/2005 | Cohen |
| 2005/0021750 A1 | 1/2005 | Abrams |
| 2005/0027382 A1 | 2/2005 | Kirmse |
| 2005/0038856 A1 | 2/2005 | Krishnasamy |
| 2005/0044152 A1 | 2/2005 | Hardy et al. |
| 2005/0050143 A1 | 3/2005 | Guster |
| 2005/0055416 A1 | 3/2005 | Heikes |
| 2005/0076240 A1 | 4/2005 | Appelman |
| 2005/0076241 A1 | 4/2005 | Appelman |
| 2005/0080859 A1* | 4/2005 | Lake ............. 709/206 |
| 2005/0114229 A1 | 5/2005 | Ackley et al. |
| 2005/0177486 A1 | 8/2005 | Yeager |
| 2005/0197846 A1 | 9/2005 | Pezaris |
| 2005/0198131 A1 | 9/2005 | Appelman |
| 2005/0198172 A1 | 9/2005 | Appelman |
| 2005/0198268 A1 | 9/2005 | Chandra |
| 2005/0216300 A1 | 9/2005 | Appelman |
| 2005/0246420 A1 | 11/2005 | Little, II |
| 2006/0031772 A1 | 2/2006 | Valeski |
| 2006/0129678 A1 | 6/2006 | Morita |
| 2008/0255989 A1 | 10/2008 | Altberg |
| 2009/0043844 A1 | 2/2009 | Zimmet |
| 2009/0070306 A1 | 3/2009 | Stroe |

FOREIGN PATENT DOCUMENTS

| | | |
|---|---|---|
| WO | WO 98/47270 | 10/1998 |
| WO | WO 99/34628 | 7/1999 |
| WO | WO 00/79396 | 12/2000 |
| WO | 01/06748 | 1/2001 |
| WO | WO 01/06748 | 1/2001 |
| WO | WO 01/67787 | 9/2001 |
| WO | 02/03216 | 1/2002 |
| WO | WO 02/03216 | 1/2002 |
| WO | 2005/086723 | 9/2005 |
| WO | 2005/089286 | 9/2005 |

OTHER PUBLICATIONS

America Online Inc., "AOL Instant Messenger", Aug. 29, 2000, Internet: www.aol.com/aim/ (18 pages).

America Online Inc., New AIM 4.7, Sep. 27, 2001, Internet: http://aim.aol.com (7 pages).

CNET Networks Inc., "PopUp Killer", Sep. 13, 2001, Internet: download.cnet.com/downloads/0-10059-100-6932612.html, (3 pages).

McKendrick, Joseph; "Internet Call Centers: New Era in Customer Service", Feb. 2002; V10, n2, (4 pages).

Nick Wingfield; Technology Journal: Changing Chat—Instant Messaging is Taking Off, and for Some Users It's Nuzzling Out the Phone; Asian WSJ; Sep. 2000, (5 pages).

(56) References Cited

OTHER PUBLICATIONS

Ryze home page, www.ryze.com, Dec. 21, 2003, available at http://web.archive.org/web/20031221010006/http://ryze.com, printed Mar. 16, 2005, (13 pages).
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Networking for Business: Release 0.5," Esther Dyson, Esther Dyson's Monthly Report, vol. 21, No. 10, Nov. 25, 2003, www.edventure.com, (36 pages).
"Social Social Networks: Deodorant for the Soul?," Esther Dyson, Esther Dyson's Monthly Report, Release 1.0, vol. 21, No. 11, Dec. 12, 2003, www.edventure.com, (36 pages).
VisiblePath webpages, www.visiblepath.org, Dec. 3, 2003, available at http://web.archive.org/web/20031203132211/http://www.visiblepath.com, printed Mar. 16, 2005, 5 pages).
WebmasterWorld.com Inc., "HTML and Browsers", Mar. 5, 2001, Internet: www.webmaster.com/forum21/637.htm, (2 pages).
ZeroDegress home page, www-zerodegrees.com, Jan. 24, 2004, available at http://web.archive.org/web/20040204153037/www.zerodegrees.com/home.htm, printed Mar. 16, 2005, (2 pages).
International Search Report dated Feb. 15, 2006 for International Application No. PCT/US05/07204.
Written Opinion dated Feb. 15, 2006 for International Application No. PCT/US05/07204.
"Technology Journal: Changing Chat—Instant Messaging is Taking Off, and for Some Users It's Nuzzling Out the Phone," Nick Wingfield, Asian WSJ, Sep. 2000.
America Online Inc., New Aim 4.7, Sep. 27, 2001, Internet: http://aim,aol.com (7 pages).
International Search Report issued in International Application No. EP03731244, dated Aug. 30, 2005, (4 pages).
Office Action issued in U.S. Appl. No. 10/146,814, dated Jul. 2, 2007, 15 pages.
Office Action issued in U.S. Appl. No. 10/146,814, dated Dec. 11, 2006, 15 pages.
Office Action issued in U.S. Appl. No. 10/184,002, dated Jan. 9, 2007, 11 pages.
Office Action issued in U.S. Appl. No. 10/334,056, dated May 12, 2008 (22 pages).
Office Action issued in U.S. Appl. No. 10/334,056, dated Nov. 5, 2007 (21 pages).
Office Action issued in U.S. Appl. No. 10/334,056, dated May 21, 2007, (7 pages).
Office Action issued in U.S. Appl. No. 10/334,056, dated May 10, 2006, (7 pages).
Office Action issued in U.S. Appl. No. 10/334,056, dated Oct. 31, 2005, 7 pages.
Office Action issued in U.S. Appl. No. 10/334,056, dated Jul. 6, 2005, 24 pages.
Office Action issued in U.S. Appl. No. 10/334,056, dated Nov. 29, 2004, 22 pages.
Office Action issued in U.S. Appl. No. 10/633,636, dated Oct. 11, 2006, 9 pages.
Office Action issued in U.S. Appl. No. 11/017,204, dated Jun. 23, 2008, 33 pages.
Office Action issued in U.S. Appl. No. 11/017,204, dated Dec. 12, 2007, 13 pages.
Office Action issued in U.S. Appl. No. 11/015,424, dated Mar. 19, 2008, 43 pages.
Ed Bott and Ron Person, Using Windows 95 with Internet Explorer 4.0, Feb. 17, 1998, Que, Special Edition, 21 pages.
R. Movva & W. Lai, "MSN Messenger Service 1.0 Protocol", Aug. 1999, Internet Draft, http://tools.ietf.org/id/draft-movva-msn-messenger-protocol-oo.txt, 28 pages.
ZeroDegrees home page, www-zerodegrees.com, Jan. 24, 2004, available at http://web.archive.org/web/20040204153037/www.zerodegrees.com/home.htm, printed Mar. 16, 2005, (2 pages).
"CrushParty.com: Help," retrieved Jun. 12, 2002 from the World Wide Web: http://www.crushparty.com/help.jsp, 3 pages.

"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"BestCalls.com Announces the BestCalls Technology Index," Business Wire, Jun. 30, 1999, Business Wire, p. 1.
"A Reputation System for Peer-to-Peer Networks," Gupta et al., Jun. 1-3, 2003, NOSSDAV'03, Monterey, California, pp. 144-152.
"Socialware: Multiagent Systems for Supporting Network Communities," Hattori et al., Mar. 1999, Association for Computing Machinery, Communications of the ACM, vol. 42, Issue 3, pp. 55ff.
"Finding Others Online: Reputation Systems for Social Online Spaces," Jensen et al., Apr. 20-25, 2002, CHI, Minneapolis, Minnesota, vol. 4, Issue 1, pp. 447-454.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Reputation Systems," Resnick et al., Dec. 2000, Communications of the ACM, vol. 43, No. 12, pp. 45-48.
"Business at Cyberspeed; Brainstorm Becomes Quick Internet Hit," Walker, Jan. 24, 1999, The Washington Post, p. A.01 (4 total pages).
"Hottie or Nottie? Web Site Voters Let You Know Whether You Sizzle or Fizzle," Marino, Jul. 11, 2001, Florida Times Union, p. C.1. (2 total pages).
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"PieSpy—Inferring and Visualizing Social Network on IRC," PieSpy Social Network Bot, reprinted from http://lister.linux-srv.anlx.net/piespy printed on Mar. 11, 2004 (18 pages).
"Instant Messaging for Garners," PC Gamer, May 2004, vol. 11, No. 5, p. 28.
"Degrees of Separation Email Spam Protection," Halfbakery: Degrees of Separation Email Spam Protection, reprinted from http://halfbakery.com/idea/Degrees_20of_20Separation_20Email_20Spam_20Protecti . . . printed on Mar. 1, 2004 (3 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 . . . , printed on Nov. 5, 2004 (3 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"Plaxo—Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"plaxo," Plaxo, reprinted from http://web.archive.org/web/20041105072256/http://www.plaxo.com/ printed on Nov. 5, 2004 (available on Feb. 14, 2004) (2 pages).
"A Countermeasure to Duplicate-detecting Anti-spam Techniques," Robert J. Hall, AT&T Labs Technical Report 99.9.1, 1999, Abst. and pp. 1-26.
"SVM-based Filtering of E-mail Spam with Content-specific Misclassification Costs," Aleksander Kolcz et al., *TextDM'2001 (IEEE ICDM-2001 Workshop on Text Mining)*, San Jose, CA, 2001, pp. 1-14.
"Announce: Implementation of E-mail Spam Proposal," Maurice L. Marvin, news.admin.net-abuse.misc, Aug. 3, 1996, 2 pages.

(56) References Cited

OTHER PUBLICATIONS

"Technical Solutions for Controlling Spam," Shane Hird, Proceedings of AUUG2002, Melbourne, Sep. 4-6, 2002, 17 pages.

"Support Vector Machines," Marti Hearst, IEEE Intelligent Systems, Jul./Aug. 1998, pp. 18-28.

"Support Vector Machines for Spam Categorization," Harris Drucker et al., IEEE Transactions on Neural Networks, vol. 10, No. 5, Sep. 1999, pp. 1048-1054.

"Text Categorization with Support Vector Machines: Learning with Many Relevant Features," Thorsten Joachims, University of Dortmund, Computer Science Dept., LS-8 Report 23, 1998, 18 pages.

"Telstra targets Net spammers," J. Dudley, news.com.au, Dec. 2, 2003, 2 pages.

"Learning Spam: Simple Techniques for Freely-Available Software," Bart Massey et al, Computer Science Dept., Portland, OR USA, 2003, pp. 1-14.

"Will You Buy a Car From This Man?," Leander Kahney, Oct. 6, 2003, pp. 1-3.

"Social Nets Find Friends in VCs," Joanna Glasner, http://www.wired.com/news, Nov. 17, 2003, pp. 1-3.

"Learning to Filter Spam E-Mail: A Comparison of a Naïve Bayesian and a Memory-Based Approach," Ion Adroutsopoulos et al., University of Athens, Sep. 2000, pp. 1-12.

"Better Bayesian Filtering," Paul Graham, Jan. 2003, pp. 1-11, http://www.paulgraham.com/better.html.

"Social Network Fragments: An Interactive Tool for Exploring Digital Social Connections." Danah Boyd, Jeff Potter. Sketch at *SIGGRAPH 2003*. San Diego, California: ACM, Jul. 27-31, 2003.

"Reflections on Friendster, Trust and Intimacy," Danah Boyd. *Ubicomp 2003*, Workshop Application for the Intimate Ubiquitous Computing Workshop. Seattle, WA, Oct. 12-15, 2003.

Home-tribe.net, http://washingtondc.tribe.net/message/24434d1b-817b-4580-aa42-3bffa15f26a?page=1 (4 total pages).

http://www.friendster.com (17 pages).

Office Action issued in U.S. Appl. No. 10/981,460, dated Aug. 20, 2008 (24 pages).

Neo Mai, Ken Neo. "Buying and selling on the internet; [Computimes, 2* Edition]." New Straits Times. Kuala Lumpur: Jun. 28, 2001. p. 53.

Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.

Reichard, K., "AOL, ICQ to Interoperate—But in a Limited Fashion," Oct. 30, 2002, InstantMessagingPlanet, available at www.instantmessagingplanet.com/public/article.php/1490771.

Viegas et al., "Digital Artifacts for Remembering and Storytelling: PostHistory and Social Network Fragments." Retrieved from the World Wide Web: http://web.media.mit.edu/~fviegas/papers/posthistory_snf.pdf, 10 total pages.

"Icq.anywhere, Email Features—Email Center—ICQ.com." Retrieved Apr. 29, 2004 from the World Wide Web: http://www.icq.com/email/popular-features.html, pp. 1-5.

"Trillian Discussion Forums—HOWTO: Import ICQ 2003a Contact List." Retrieved Apr. 29, 2004 from the World Wide Web: http://trillian.cc/forums/showthread.php?s+&threadid=36475, pp. 1-2.

"Lotus Instant Messaging Everyplace FAQ." Retrieved Apr. 29, 2004 from the World Wide Web: http://www.lotus.com/products/product4.nsf/wdocs/249c6f083166cd3e85256d7300714407, pp. 1-3.

"RIM Road: Software: Internet & Network: Webmessenger RIM J2ME/Instant Messaging." Retrieved Apr. 29, 2004 from the World Wide Web: http://www.rimroad.com/software/riml/Webmessenger-RIM-J2ME-Instant-Messaging-20 . . . , pp. 1-4.

International Search Report and Written Opinion issued in International Application No. PCT/US09/45663, dated Apr. 11, 2008.

Supplementary European Search Report issued in European Application No. 05 72 8303, dated Jan. 9, 2009, 2 pages.

Office Action issued in U.S. Appl. No. 10/334,056, dated Oct. 30, 2008, 19 pages.

Office Action issued in U.S. Appl. No. 10/746,230, dated Mar. 17, 2009, 13 pages.

Office Action issued in U.S. Appl. No. 10/746,232, dated Mar. 18, 2009, 26 pages.

Office Action issued in U.S. Appl. No. 11/015,423, dated Mar. 2, 2009, 33 pages.

Office Action issued in U.S. Appl. No. 11/015,424, dated May 1, 2009, 47 pages.

Office Action issued in U.S. Appl. No. 11/079,522, dated Oct. 16, 2008, 21 pages.

Office Action issued in U.S. Appl. No. 11/079,522, dated Apr. 3, 2009, 14 pages.

Office Action issued in U.S. Appl. No. 11/237,718, dated Apr. 2, 2009, 53 pages.

\* cited by examiner

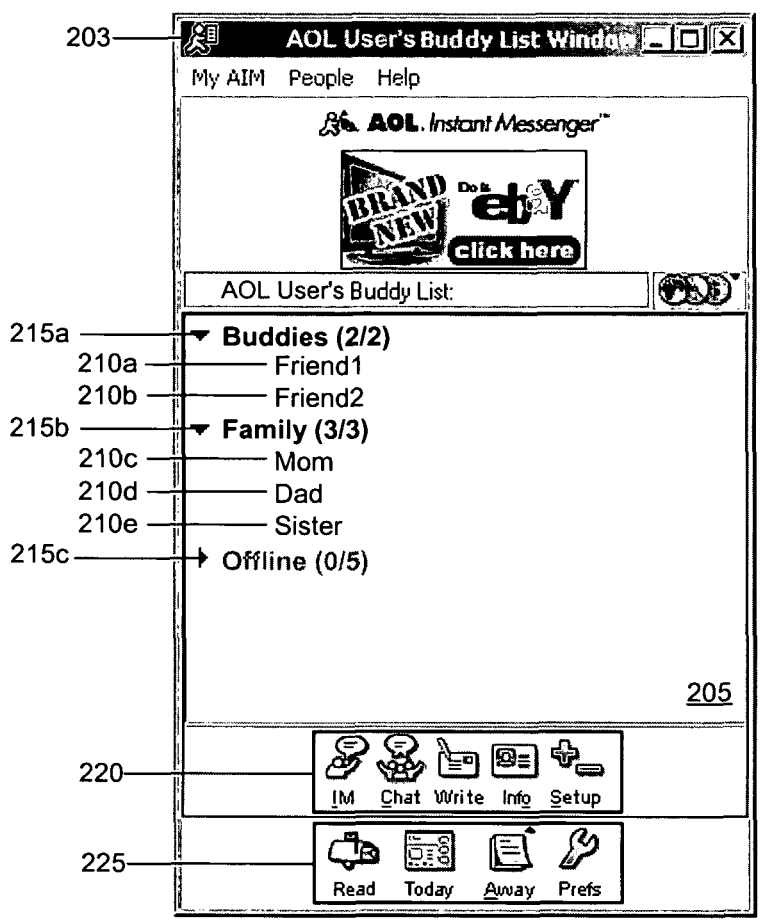
Figure 2A: Before

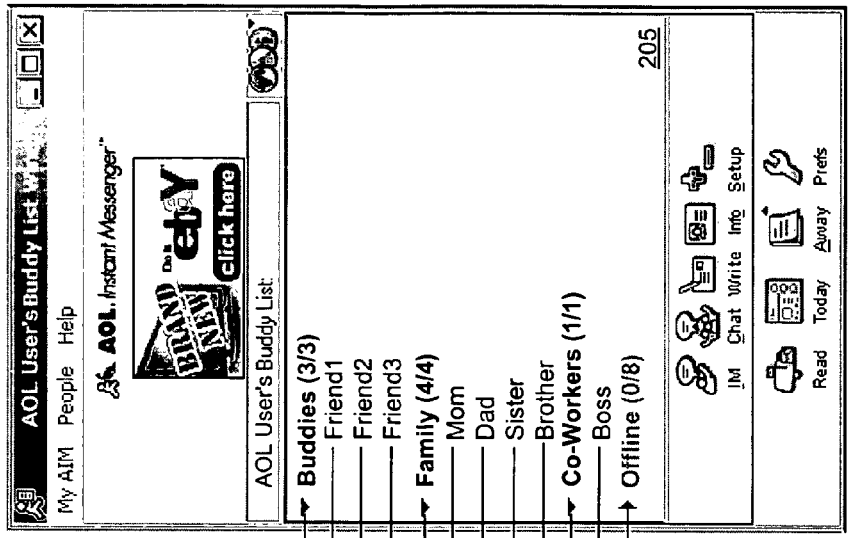
Figure 2C: After
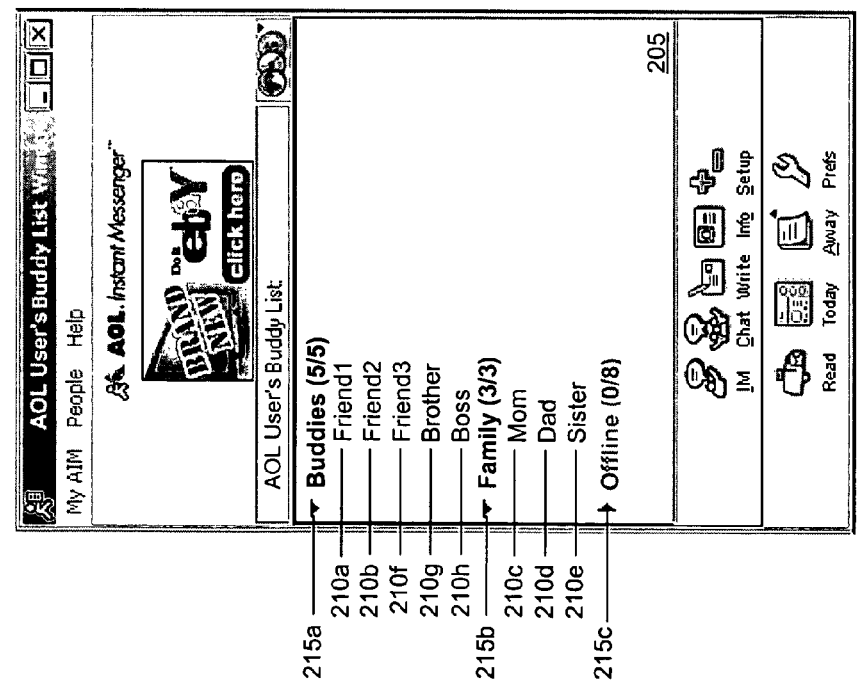
Figure 2B: After

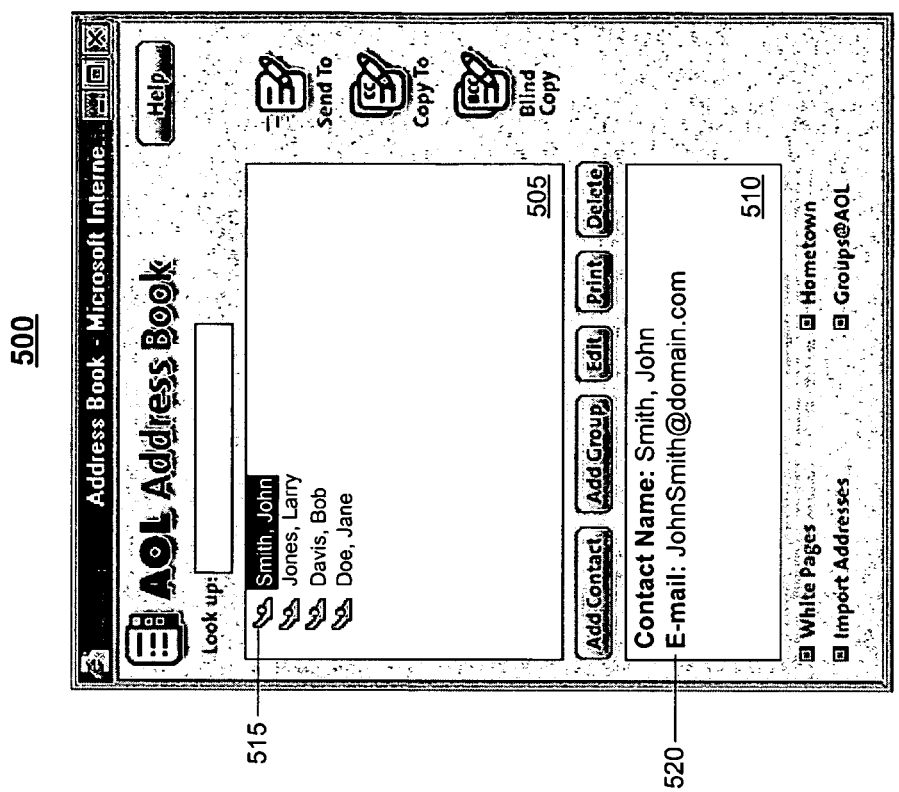
Figure 5B: After
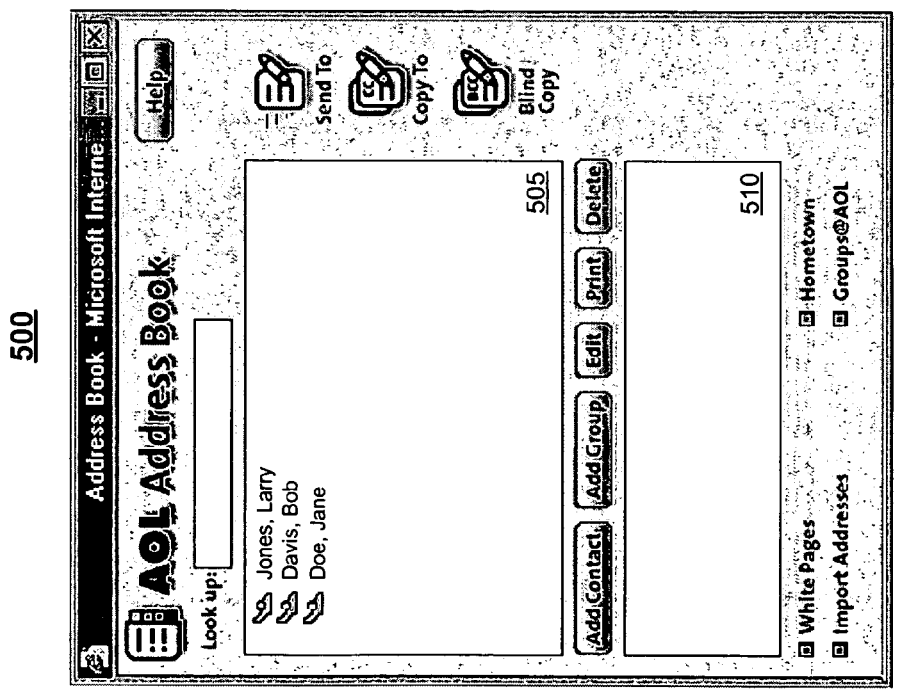
Figure 5A: Before

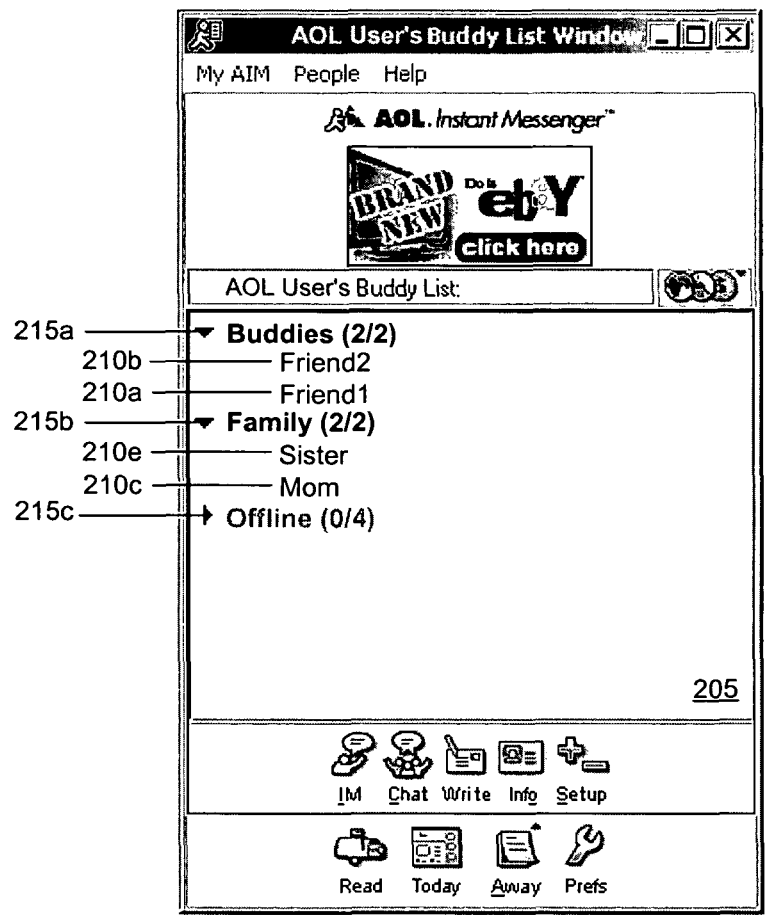
Figure 7A: After

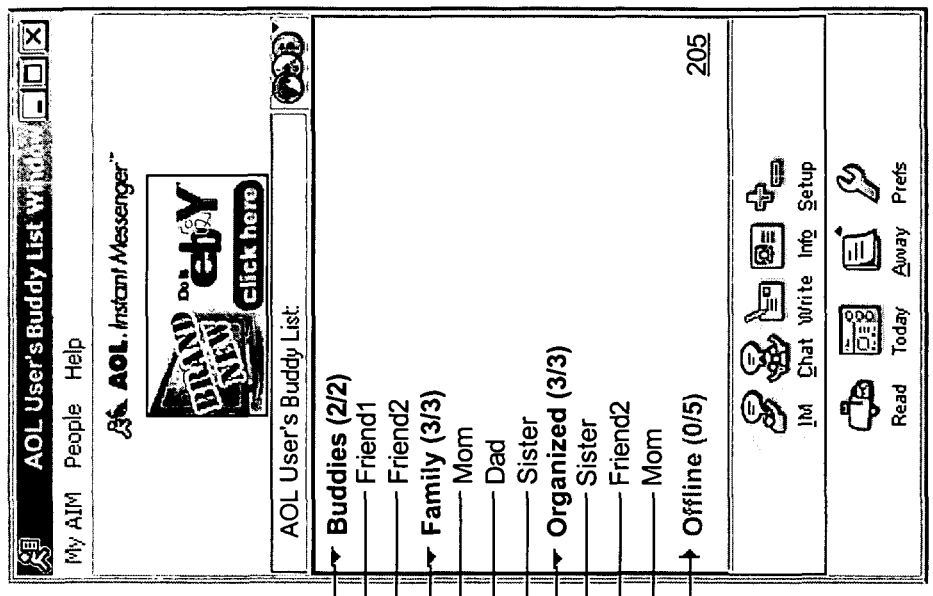
Figure 7C: After
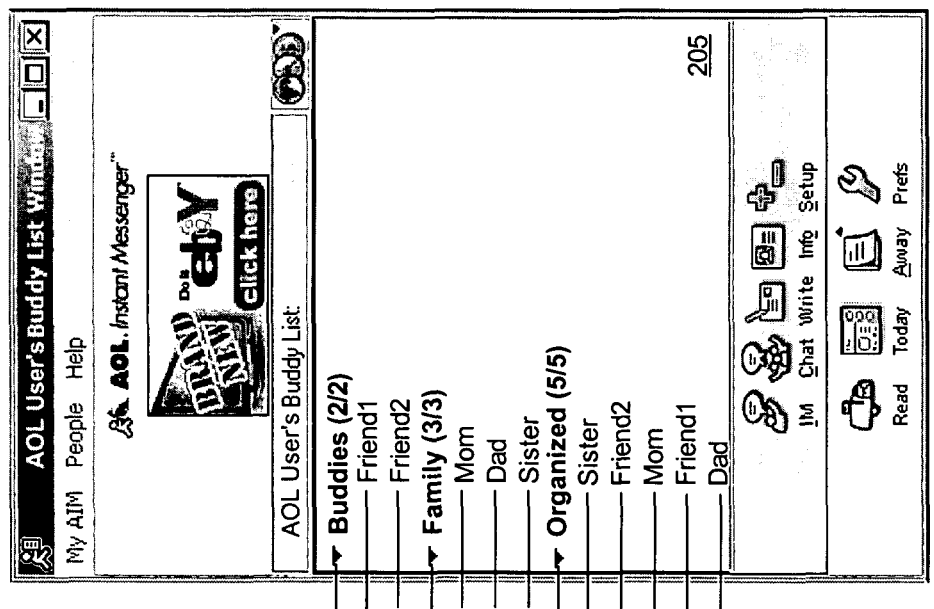
Figure 7B: After

ANNOUNCING NEW USERS OF AN ELECTRONIC COMMUNICATIONS SYSTEM TO EXISTING USERS

CROSS REFERENCE TO RELATED APPLICATIONS

This application claims the benefit of U.S. Provisional Patent Application Ser. No. 60/549,937, filed on Mar. 5, 2004, and titled "Passive Population of Buddy List from a Contact List", the entire contents of which are hereby incorporated by reference. This application also claims the benefit of U.S. Provisional Patent Application Ser. No. 60/552,718, filed on Mar. 15, 2004, and titled "Social Networks."

TECHNICAL FIELD

This document relates to passively populating participant lists of an electronic communications system and organizing the entries within the participant lists.

BACKGROUND

When a user first uses an electronic communications system, the user may be provided with a participant list to be used with the electronic communications system. The user may populate a participant list with identifiers of other users of the electronic communications system with which communication may occur through the electronic communications system. The task of manually populating the participant list may be inefficient, especially when a large number of other users are to be added to the participant list. The user also may desire to notify the other users that the user has become a new user of the electronic communications system. Manually doing so also may be burdensome when the number of other users is large.

The user may not be involved in strong relationships with all of the users or may not communicate with all of the users included in the participant list. Furthermore, as users are continually added to the participant list, the participant list may include users with which the user no longer communicates or with which the user otherwise has a relationship with a low strength. The users included in the participant list having high strength relationships with the user may be mixed with users having low strength relationships with the user, which may prevent the user from easily identifying and accessing the users corresponding to high strength relationships, especially when the number of users corresponding to high strength relationships is small relative to the size of the entire participant list.

SUMMARY

In one general aspect, announcing new users of an electronic communications system includes receiving an indication of a new user of an electronic communications system. The new user has an identifier for the electronic communications system. Existing users of the electronic communications system that are known to the new user are identified. The identified existing users are sent a message notifying the identified existing users of the identifier of the new user.

Implementations may include one or more of the following features. For example, the identified existing users may be enabled to add the identifier of the new user to participant lists used by the identified existing users. The new user may be enabled to add identifiers of the identified existing users to a participant list of the electronic communications system used by the new user. The identifiers of the identified existing users may be determined.

Identifying the existing users that are known to the new user may include identifying identifiers of the electronic communications system that correspond to the identified existing users.

Identifying the existing users that are known to the new user may include identifying existing users that are included in a contact list maintained by the new user.

Identifying the existing users that are known to the new user may include identifying existing users of the electronic communication system that include the new user in contact lists maintained by the existing users and that are included in a contact list maintained by the new user.

Identifying the existing users that are known to the new user may include identifying existing users of the electronic communications system that are less than a maximum allowable number of degrees of separation away from the new user.

Identifying the existing users that are known to the new user may include identifying existing users of the electronic communications system with which the new user has exchanged more than a threshold number of messages.

Identifying the existing users that are known to the new user may include identifying the existing users of the electronic communications system that have exchanged messages with the new user at a frequency that exceeds a threshold frequency.

Identifying the existing users that are known to the new user may include identifying the existing users of the electronic communications system that are subscribers to contact information of the new user or publishers of contact information to which the new user subscribes.

Identifying the existing users that are known to the new user may include identifying the existing users of the electronic communications system that have exchanged messages with the new user in a chat room at a frequency that exceeds a threshold frequency.

Identifying the existing users that are known to the new user may include identifying the existing users of the electronic communications system that have exchanged messages with the new user for longer than a threshold amount of time.

Identifying the existing users that are known to the new user may include identifying the existing users of the electronic communications system for which the new user holds an amount of contact information that exceeds a threshold amount, or that hold the an amount of contact information for the new user that exceeds the threshold amount.

Identifying the existing users that are known to the new user may include identifying the existing users of the electronic communications system that that both send messages to the new user and receive messages from the new user.

Identifying the existing users that are known to the new user may include identifying the existing users of the electronic communications system that have a communications strength with a different user that exceeds a threshold communications strength.

The participant list may be a buddy list of an instant messaging system, an address book of an e-mail system, or a social network of the user. The electronic communications system may be an instant messaging system, and the message notifying the existing user may be an instant message. The electronic communications system may be an e-mail system, and the message notifying the existing users may be an e-mail message. The electronic communications system also may be a chat system.

In another general aspect, a graphical user interface is used to manage a list of users of an electronic communications system with which electronic messages may be exchanged. The graphical user interface includes a participant list display associated with a user of the participant list display that includes users of an electronic communications system. One or more of the users are included automatically in the participant list display as a result of the user receiving indications identifying the one or more users as new users of the electronic communications system.

Implementations may include one or more of the following features. For example, the participant list display may include groups that are associated with one or more of the users included in the participant list display. A group included in the participant list display may be associated with the one or more automatically included users.

The participant list display may be a display of a buddy list associated with an instant messaging system, or a display of an address book associated with an e-mail system.

These general and specific aspects may be implemented using a system, a method, or a computer program, or any combination of systems, methods, and computer programs.

Other features will be apparent from the description and drawings, and from the claims.

DESCRIPTION OF DRAWINGS

FIGS. 2A-2C are illustrations of a participant list before (FIG. 2A) and after (FIGS. 2B and 2C) known contacts are automatically added.

FIGS. 5A and 5B are illustrations of a participant list before (FIG. 5A) and after (FIG. 5B) new users are automatically added.

FIGS. 7A-7C are illustrations of the participant list of FIG. 2A after the entries in the participant list are organized.

Like reference symbols in the various drawings indicate like elements.

DETAILED DESCRIPTION

Figure 1:
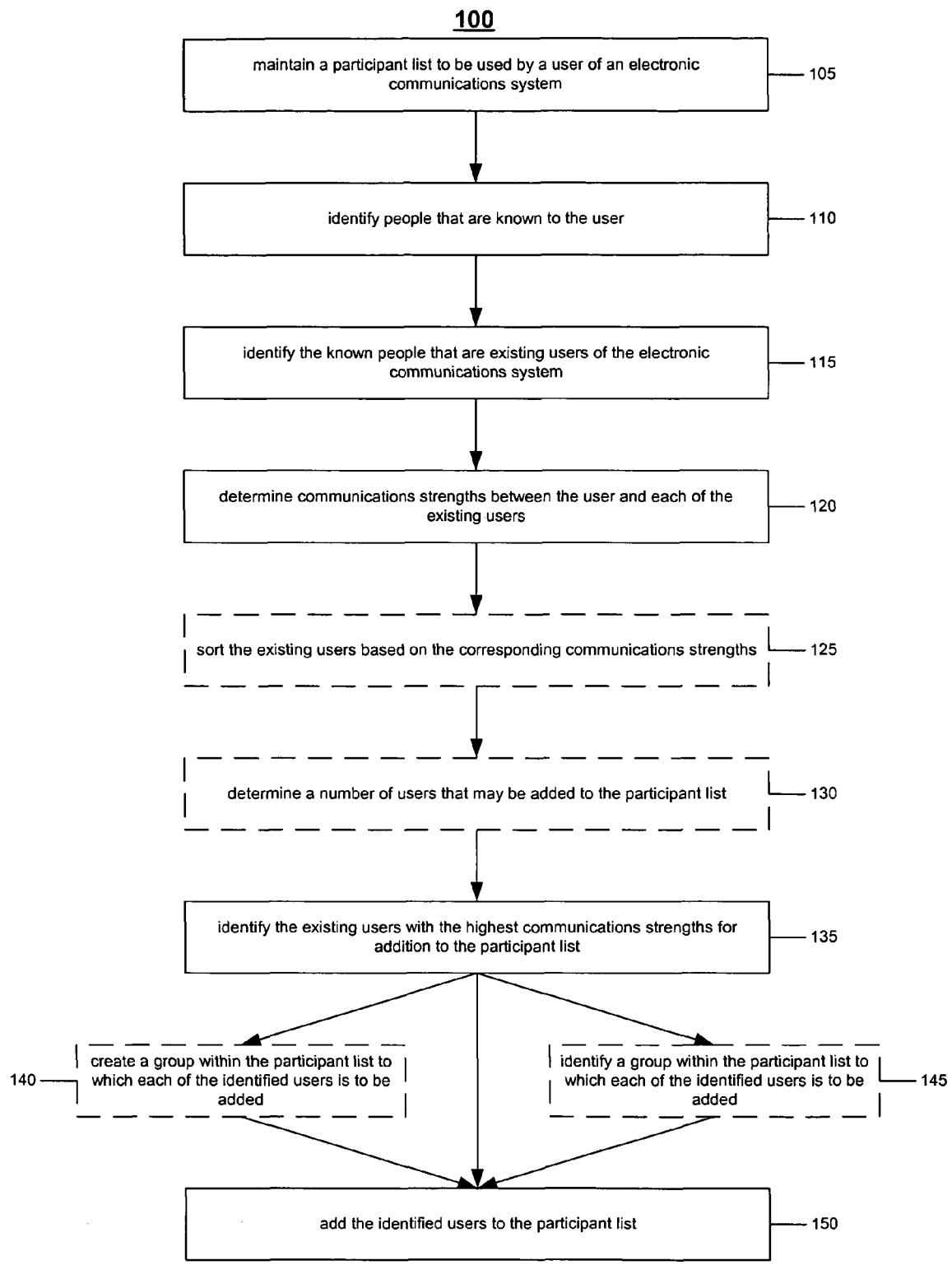
FIG. 1 is a flow chart of a process for passively populating a participant list for a user of an electronic communications system with known contacts of the user.

When a user first becomes a user of an electronic communications system, a notification of an identifier of the new user within the electronic communications system is sent automatically to other users of the electronic communications system that are known to the new user. In response to the notification, the known users are enabled to add the identifier to their participant lists associated with the electronic communications system. In addition, the new user may be enabled to add identifiers of the known users to a participant list maintained by the new user. The known users may be identified from a contact list that is used by the new user. A strength of the relationship between the first user and each of the known users may be determined, and a portion of the known users (e.g., the known users with the strongest relationships) may be notified of the new identifier. Sending such a notification prevents the new user from having to manually notify the known users of the new identifier and prevents the known users from having to manually add the new identifier to their personal participant lists.

A first user may exchange electronic messages with a second user, and the relationship between the first and second users with respect to the exchanging of electronic messages may be described by a communications strength between the first and second users. The communications strength between the first and second users is a numerical measure of the strength of the relationship between the first and second users with respect to exchanging electronic messages. Higher communications strengths typically correspond to stronger relationships. Communications strengths may be useful when comparing relationships while passively adding contacts to participant lists, announcing new membership to known contacts, or organizing participant lists. The communications strength between the first and second users also may be called the communications strength of the first user with respect to the second user, the communications strength of the second user with respect to the first user, or more simply the communications strength of the first or second users.

A calculation of the communications strength between the first and second users may consider the number of messages that are exchanged between the first and second users, and a higher number of messages may correspond to a higher communications strength. Similarly, the calculation may consider the frequency with which messages are exchanged between the first and second users, and a higher frequency may correspond to a higher communications strength. In implementations where the first and second users are users of a chat room, the calculation may consider the frequency with which messages are exchanged between the first and second users in the chat room, and a higher frequency of messages exchanged in the chat room may correspond to a higher communications strength.

The time over which messages are exchanged by the first and second users may affect the communications strength between the first and second users. In general, a longer amount of time over which the first and second users exchange messages may correspond to a higher communications strength. For example, the communications strength between the first and second users may be higher when the first and second users exchange a lower number of messages over a longer period of time than when the first and second users exchange a higher number of messages over a shorter period of time. Similarly, the communications strength may be higher when the first and second users exchange messages with a lower frequency for a longer period of time than when the first and second users exchange messages with a higher frequency for a shorter period of time. In general, exchanging messages over a longer period of time may indicate that the first and second users have a stronger, more enduring relationship.

A calculation of the communications strength between the first and second users may consider only messages sent between the first and second users with the electronic communications system, or all types of messages sent between the first and second users. For example, in implementations where the electronic communications system is an instant messaging system, the communications strength between the first and second users may depend on the instant messages sent between the first and second users, or the communications strength may depend on all communications between the first and second users, including, for example, instant messages, e-mail messages, and cellular telephone calls.

Alternatively or in addition to using the exchanging of electronic messages to measure communications strength between users, whether or not a first user and a second user each list each other in respective contact lists, such as address books, buddy lists, e-mail distribution lists, social networks, mobile telephone phone books, lists of members of an organization, and/or white lists, may be considered when calculating the communications strength between the first and second users. Inclusion in respective contact lists may be indicative of a strong relationship between the first and second users. As a result, a high communications strength may be assigned when the first user is listed in a contact list used by the second user and when the second user is listed in a contact list used by the first user. Each contact list may be a contact list that includes a single user's contacts, or a global contact list that includes multiple users' contacts. A lower communications strength may be assigned when only one of the first and second users lists the other user in a contact list used by the first or second user. An even lower communications strength may be assigned when neither the first nor the second user includes the other user in a respective contact list. The type of contact lists that include the first or second users may affect the communications strength. For example, a higher communications strength may be assigned when the first and second users are listed in mobile telephone phone books than when the first and second users are listed in white lists. Such a communications strength may be assigned because adding the first and second users to the mobile telephone phone books may be harder and may require more effort by the first and second users than adding the first and second users to the white lists.

The calculation of the communication strength also may consider the amount and type of contact information that the first and second users have for one another. The communications strength may be directly related to the amount of contact information that the first and second users have for one another. For example, a higher communications strength may be assigned when the first user has both work and home contact information for the second user than when the first user only has work or home contact information for the second user. As another example, a higher communications strength may be assigned when the second user has home contact information for the first user than when the second user has work contact information for the first user. Such a consideration may be particularly important when the second user typically communicates with the first user when the first user is at home.

The calculation of the communications strength also may consider the degree of separation between the first and second users. The degree of separation between the first and second users describes a relationship between the first and second user. A low degree of separation between the first and second users may indicate a close, and consequently strong, relationship. Typically, user contact lists are evaluated to determine the number of degrees (or hops) that are required to link or relate the first and second users. For example, user A may list user B in user A's address book, user B may list user C in user B's address book, and user C may list user D in user C's address book. Here, user D is linked to user A by two degrees of separation (with user B as the first degree and user C as the second degree). User A is related to user C by one degree of separation (user B) and user B is separated from user D by one degree of separation (user C). Users A and B, users B and C, and users C and D are each respectively separated by zero degrees of separation. In general, a smaller degree of separation may correspond to a higher communications strength.

Whether or not the first and second users are direct or indirect addressees of messages sent between the first and second users may be considered when calculating the communications strength between the first and second users. The first and second users being direct addressees of the messages may be indicative of a strong relationship between the first and second users. The first user may be called a direct addressee of a message from the second user when the message is received directly from the second user, and the first user may be called an indirect addressee of the message when the message is received from the second user through one or more other users. In general, the number of other users through which the message is received is inversely proportional to the communications strength between the first and second users.

Alternatively or additionally, in implementations where the messages sent between the first user and the second user are e-mail messages, whether the first and second users are listed in the "To," "Carbon Copy," or "Blind Carbon Copy" fields of the e-mail messages may indicate whether the first and second messages are direct or indirect addressees. For example, if the second user is listed in the "To" field of an e-mail message sent by the first user, the second user may be a direct addressee of the message. If the second user is listed in the "Carbon Copy" or "Blind Carbon Copy" fields of the e-mail message, the second user may be an indirect addressee of the message. A higher communications strength may be assigned when the first or second users are direct addressees than when the first or second users are indirect addressees. The number of times that the first and second user are direct or indirect addressees may affect the communications strength, with the communications strength being directly related to the number of times that the first and second user are direct or indirect addressees.

Similarly, whether or not the first and second users are both senders and recipients of messages sent between one another may be considered when calculating the communications strength between the first and second users. The first and second users being both senders and recipients of the messages may be indicative of a strong relationship between the first and second users. A higher communications strength may be assigned when both the first and the second users are both senders and recipients of the messages. A lower communications strength may be assigned when both the first and second users are not both senders and recipients of the messages, which may occur when the first user sends messages to the second user and does not receive messages from the second user in response, or vice versa.

The first and second users may publish personal contact information, and the first and second users may subscribe to the published contact information. More particularly, the first user may subscribe to contact information published by the second user, and the second user may subscribe to contact information published by the first user. When a user subscribes to published contact information, any changes to the published contact information are automatically propagated to the user. Subscribing to each other's contact information may be indicative of a strong relationship between the first and second users. Therefore, a high communications strength may be assigned to the relationship between the first and second users when the first and second users subscribe to each other's contact information. A lower communications strength may be assigned to the relationship when only one of the first and second users subscribes to the other user's published contact information. An even lower communications strength may be assigned when neither of the first and second users subscribes to each other's contact information.

Other characteristics of the first and second user or their communication behavior may be considered when calculating the communications strength between the first and second users. For example, a type of relationship between the first and second user may affect the communications strength between the first and second user. For example, in one implementation, a higher communications strength may be assigned if the first and second users are family members than if the first and second users are business contacts.

One or more of the above characteristics of the relationship may be included in a calculation of the communications strength between the first and second users. For each of the included characteristics, a numerical measure corresponding to the characteristics is identified. The numerical measure of a characteristic may be a raw measurement of the characteristic or some other numerical value representative of the characteristic. The communications strength may be calculated from the numerical measures of the characteristics using, for example, a weighted average or some other function of the numerical measures of the characteristics.

In some implementations, the communications strength between the first and second users may depend on the communications strength between the first user and a third user, or on the communications strength between the second user and the third user. For example, a relationship may not have been established between the first and second users, which may prevent the calculation of the communications strength between the first and second users. The relationship between the third user and the first or second user may be similar to the expected relationship between the first and second users. For example, the first user may be a new employee of a company that already employs the second and third users. The first user may be working with the second user in a similar manner as the third user, so the relationship between the second and third users may model the expected relationship between the first and second users. As a result, the communications strength between the second and third users may represent the expected communications strength between the first and second users. The communications strengths of the third user with the first or second users may be calculated as described above. The communications strength between the second and third users also may be combined with the communications strength between the first and second users that is calculated as described above. In some implementations, the communications strengths between the second user and multiple other users may be combined with the calculated communications strength between the first and second users.

In some implementations, the first user or the second user may use multiple identifiers when communicating over the electronic communications system. For example, the first user may have two identities that are both used to communicate with the second user. A separate communications strength may be calculated for each of the identifiers. The separate communications strength for a particular identifier describes the relationship between the first user and the second user when communicating with the particular identifier. The overall communications strength between the first and second user may be calculated by combining the separate communications strengths for each of the multiple identifiers. For example, a weighted average of the separate communications strengths may be used to combine the separate communications strengths into the overall communications strength between the first and second users.

The communications strength between the first and second users may be calculated in real time as the first and second users communicate. For example, each time a message is sent between the first and second users, a calculation of the communications strength may be performed. Alternatively or additionally, the communications strength may be determined after the messages have been exchanged. For example, logs of the messages sent between the first and second users, such as an e-mail log or an instant message log, may be inspected and processed to determine the communications strength. Other information indicative of the relationship between the first and second users may be processed when calculating the communications strength.

Referring to FIG. 1, a process 100 is used to passively populate a participant list to be used by a user of an electronic communications system with other users of the electronic communications system. The process 100 identifies other users of the electronic communications system that are known to the user and adds identifiers of those known users to the participant list. If all of the known users may not be added to the participant list, a portion of the known users (e.g., the known users that have the highest communications strengths) is added to the participant lists. Identifiers of the known users may be added to the participant list in general, or to specific groups within the participant list. The process 100 may be executed when the user first becomes a user of the electronic communications system, periodically on a recurring basis, or after an indication to execute the process 100 is received from the user.

The process 100 begins by maintaining a participant list to be used by the user of the electronic communications system (105). The participant list is maintained for use by the user such that the user may use the participant list to communicate with the other users included in the participant list. The participant list includes one or more identifiers of other users of the electronic communications system, and the other users typically are the other users with whom the first user commonly communicates. The first user may select an identifier from the participant list to address a message to be sent with the electronic communications system to the corresponding user. The identifiers included in the participant list may be separated into one or more groups that categorize or otherwise organize the other users.

Other people that are known to the user are identified (110). The known people may be identified from a contact list that includes contact information for people with whom the user may communicate. People included in the contact list are inferred to be known by the user. Examples of the contact list include a buddy list of an instant messaging system, an e-mail address book of an e-mail system, an e-mail distribution list, a list of people in the user's social network, a list of people in a phone book of a mobile telephone used by the user, a list of members of an organization that includes the user, and a white list of people from whom communications are allowed. The contact list may be maintained by the user himself, or by another person or a central system on behalf of the user. For example, the user may be an employee of a company, and the contact list may be a list of e-mail addresses of all employees of the company that is maintained by the company. The user may access and use the contact list from the central system, or the user may use a copy of the contact list that is stored on a computer system used by the user. In one implementation, the set of people known to the user is filtered to include only the people known to the user that are not already included in the participant list.

The known people that are existing users of the electronic communications system are identified (115). In one implementation, identifying the known people that are existing users of the electronic communications system may include identifying identifiers of the known people in the electronic communications system. Identifying the identifiers of the known people may implicitly indicate whether each of the known people is a user of the electronic communications system. More particularly, if an identifier for one of the known people in the electronic communications system may not be identified, then it may be assumed that the known person is not an existing user of the electronic communications system. The known person may be sent an invitation to join the electronic communications system using the information in the contact list.

In some implementations, the contact list includes an indication of the identifiers of the known users in the electronic communications system, and identifying the identifiers of the known people may include identifying the identifiers from the contact list. If the contact list does not include an identifier for a known person, then it may be assumed that the known person is not a user of the electronic communications system. In other implementations where the contact list does not include the identifiers, the identifiers may be otherwise determined. For example, contact information in the contact list may be used to identify the identifiers for the known people. For instance, the participant list may be a buddy list of an instant messaging system and the contact list may include e-mail addresses of the known people that are not identifiers of the known people in the instant messaging system. However, the instant messaging system may maintain a mapping of e-mail addresses to identifiers, and the e-mail addresses may be used to identify the corresponding identifiers from the mapping. If the mapping does not include an identifier for an e-mail address of a known person, then it may be assumed that the known person is not a user of the instant messaging system. Other contact information, such as, for example, a phone number, a name, and/or an address, may be used to identify the identifiers for the known people. For example, a system may maintain a mapping of other contact information to identifiers, and the other contact information may be used to identify the corresponding identifiers from the mapping.

Communications strengths are determined for each of the known people for which an identifier in the electronics communications system has been identified (120). The communications strengths may be calculated from one or more characteristics of the relationship between the user and each of the existing users, as described above. Alternatively or additionally, the communications strengths may be indicated by the contact list from which the known people were identified. For example, the contact list may be organized such that the communications strengths of the included people are indicated by the positions of the included people within the contact lists. The existing users may be sorted based on the communications strengths that have been determined (125). Sorting the existing users by corresponding communications strength may help in determining which of the existing users are added to the participant list.

In other exemplary implementations, communications strengths may be determined between the user and the people known to the user, and the known people that are existing users of the communications system then may be identified.

A number of the existing users that may be added to the participant list may be determined (130). The participant list may have a maximum capacity, such that the participant list does not have sufficient space for all of the known people for which identifiers have been identified. In such a case, the number of existing users that may be added to the participant list is the number of remaining spaces in the participant list. Alternatively or additionally, the number of existing users that may be added may depend on the corresponding communications strengths. For example, a particular number of existing users may be determined because adding more existing users to the participant list may result in the addition of existing users with a communications strength that is lower than desired.

The known people corresponding to the highest communications strengths are identified for addition to the participant list (135). For example, a number of the known people with the highest communications strengths equal to the maximum allowable number of additions to the participant list may be identified for addition to the participant list. In implementations where a number of allowable additions is not determined, all of the existing users may be identified for addition to the participant list.

A group within the participant list to which each of the existing users is to be added may be created (140). For example, a special group may be created within the participant list for users that have been passively added to the participant list with the process 100. Alternatively or additionally, a group may be created for users in the participant list that have a certain characteristic. For example, a group may be created within the participant list for co-workers of the user because one or more of the known people to be added are determined to be co-workers of the user, and such a group is not already included in the participant list.

Alternatively or additionally, an existing group in the participant list to which each of the existing users is to be added may be identified (145). The existing group may be identified because one or more of the users of the existing group share a characteristic with each of the existing users to be added to the group, or because one or more of the users of the existing group are otherwise associated with each of the existing users. Alternatively or additionally, the existing group may be identified for each of the existing users because each of the existing users is included in a corresponding group in another contact list, such as the contact list that indicated that the existing users are known to the user.

In order to identify or create groups for the known people that have been identified for addition to the participant list, additional information describing the known people may be accessed. The additional information may identify characteristics of the known people that may be useful in identifying groups to which the known people should be added. In one implementation, profiles of the known people in the electronic communications system are accessed for use in identifying or creating groups to which the known people should be added.

The existing users that have been identified for addition to the participant list are then added to the participant list (150). In implementations where groups within the participant list have been identified for each of the existing users, the existing users are added to those groups. In implementations where groups have not been identified, the existing users are simply added to the list in general or to a default group within the list. For example, the existing users may be added to a general user group within the participant list.

In some implementations, the user of the electronic communications system whose participant list is maintained with the process 100 may use multiple identifiers when communicating over the electronic communications system. For example, the user may have a business identifier that is used with communicating during business hours or with business contacts, and a family identifier that is used when communicating with family members. The multiple identifiers may be linked such that the user may communicate using more than one of the multiple identities at a time. Furthermore, the user may maintain a participant list for each of the multiple identities. The participant list for a particular identifier may include other users with whom the user communicates using the particular identifier. For example, the participant list for the business identifier of the user may include the business contacts of the user, and the participant list for the family identifier may include the family member of the user. The participant lists for each of the multiple identities may be conglomerated into a single participant list that is maintained with the process 100.

When an existing user that is known to the user is added to the single participant list for the user during the process 100, an appropriate participant list within the single participant list for the existing user may be identified. For example, the existing user may be determined to be a business contact of the user, so the existing user may be added to the participant list corresponding to the business identifier of the user. The appropriate participant list for the existing user may be identified in a similar manner to how appropriate groups were identified or created for each of the identified users to be added to the participant list (140, 145).

In some implementations of the process 100, people known to the user that are not existing users of the electronic communications system may be added to the participant list of the user. When a person that is not an existing user of the electronic communications system is added to the participant list of the user, the person may be enabled to use the electronic communications system to communicate with the user. For example, the person may be made a trial user of the electronic communications system when the person is added to the participant list of the user with the process 100. The person then may choose to become a full user of the electronic communications system after being a trial user.

Referring to FIG. 2A, a buddy list interface 200 for a given user displays the screen names of other selected users of an instant messaging system with which the given user regularly communicates. The other selected users form a buddy list for the given user. Communications with one of the other selected users may be initiated through selection of the corresponding screen name for the other user from the buddy list. The other users may have been added to the buddy list by the given user manually using identifiers of the other users in the instant messaging system that are known to the given user at the time of addition. More particularly, the buddy list interface 200 illustrated in FIG. 2A may be presented to the given user before the process 100 of FIG. 1 is executed for the given user.

The buddy list interface 200 includes a text box 205 that contains the buddy list for the given user, who is identified by a screen name "AOLUser," as indicated in the title bar 203 of the buddy list interface 200. The buddy list in the buddy list interface 200 includes multiple screen names 210a-210e. More particularly, the buddy list includes the screen name "Friend1" 210a, the screen name "Friend2" 210b, the screen name "Mom" 210c, the screen name "Dad" 210d, and the screen name "Sister" 210e.

The screen names within the buddy list shown by buddy list interface 200 are organized into multiple buddy groups 215a-215c. Each screen name within the buddy list is associated with at least one of the buddy groups 215a-215c. The buddy list includes a "Buddies" buddy group 215a, a "Family" buddy group 215b, and an "Offline" buddy group 215c. The screen name 210a appears below the heading for the buddy group 215a because the screen name 210a has been associated with the buddy group 215a and the corresponding user is present, that is, logged into the instant messaging system and available to send and receive instant messages. The heading for each of the buddy groups 215a and 215b indicates the number of buddies in the group currently logged into the instant messaging system, as well as the total number of buddies in the group. For example, two out of the two members of the buddy group 215a are logged into the instant messaging system for which the buddy list interface 200 is displayed. Similarly, the heading for the "Offline" buddy group 215c indicates the number of other users on the buddy list that are not logged into the system (i.e., 0) and the total number of buddies on the buddy list (i.e., 5). Typically, when users log into the instant messaging system, screen names of the users are moved from the "Offline" buddy group 215c to one of the other buddy groups 215a or 215b.

The buddy list interface 200 also includes controls 220 that enable the given user to communicate with the other selected users corresponding to the screen names 210a-210e. For example, the given user may send instant messages, chat invitations, or e-mail messages to the communications identities referenced in the buddy list through use of the controls 220. The controls 220 also enable the user to obtain information describing the other users, as well as to modify the set of other users referenced in the buddy list interface 200.

The buddy list interface 200 also includes controls 225 that enable the given user to access other information not directly related to sending and receiving instant messages. For example, the given user may use the controls to access e-mail messages or other special features of the instant messaging system. The given user also may use the controls 225 to modify preferences for the buddy list interface 200.

Referring also to FIGS. 2B and 2C, the buddy list displayed in the buddy list interface 200 may be augmented with additional screen names after the process 100 of FIG. 1 is executed for the given user to automatically add screen names of other users known by the given user to the buddy list. More particularly, a screen name 210f, "Friend3;" a screen name 210g, "Brother;" and a screen name 210h, "Boss" have been added to the buddy list interfaces 200 illustrated in FIGS. 2B and 2C. The users corresponding to the screen names 210f-210h are existing users of the instant messaging system and are known to the given user. The screen names 210f-210h may be added to general or specific groups within the buddy list interface 200. The screen names 210a-210e remain associated with the same respective buddy groups 215a and 215b as before the process 100 was executed.

In some implementations of the buddy list interface 200, one of the buddy groups 215a and 215b may be designated as a default buddy group to which screen names are added when different groups for the screen names are not specified. For example, in the buddy list interface 200 illustrated in FIG. 2B, the buddy group 215a was designated as the default buddy group, and the screen names 210f-210h were automatically added to the buddy group 215a during the execution of the process 100. The screen names 210f-210h were added to the buddy group 215a because a specific group was not identified for the screen names 210f-210h during the process 100.

Alternatively or additionally, specific groups to which the screen names 210f-210h are to be added may be identified during the process 100. The screen names 210f-210h may be added to one or more groups in the buddy list, and the one or more groups in the buddy list may need to be created before the screen names 210f-210h may be added, as is illustrated in the buddy list interface 200 of FIG. 2C. In FIG. 2C, the screen name 210f has been added to the default buddy group 215a, either because the buddy group 215a was explicitly identified as the group to which the screen name 210f was to be added, or because a group to which the screen name 210f was to be added was not identified.

The screen name 210g "Brother" was added to the buddy group 215b named "Family." The screen name 210g may be added to the buddy group 215b because the user corresponding to the screen name 210g may share a characteristic or may be otherwise associated with the users corresponding to the other screen names 210c-210e included in the buddy group 215b (i.e., they are family members of the given user). The screen name 210g also may be added to the buddy group 215b because the user corresponding to the screen name 210g may be included in a corresponding group in another contact list, such as the contact list that was used during the process 100 to identify the user as being known to the given user.

The screen name 210h "Boss" has been added to a new buddy group 215d called "Co-Workers." The user corresponding to screen name 210h is the only member of the new buddy group 215d and is presently logged into the instant messaging system, as indicated in the heading of the buddy group 215d. The buddy group 215d may be created for users corresponding to screen names in the participant list that have a certain characteristic, including the user corresponding to the screen name 210h (i.e. they are co-workers of the given user). As such, the buddy group 215d is created for the user corresponding to the screen name 215h. Other users that are co-workers of the given user may have their screen names added to the buddy group 215d of the participant list later.

The given user may be presented with a notification that screen names are being added automatically to the buddy list displayed in the buddy list interface 200. The given user may be enabled to accept the screen names to be added such that the automatically added screen names become visible in the buddy list interface 200. Alternatively, the given user may dismiss the screen names to be added, in which case, the screen names are not added to the displayed buddy list and are not visible in the buddy list interface 200. The given user also may be enabled to accept some of the screen names to be added and dismiss others of the screen names to be added.

Figure 3:
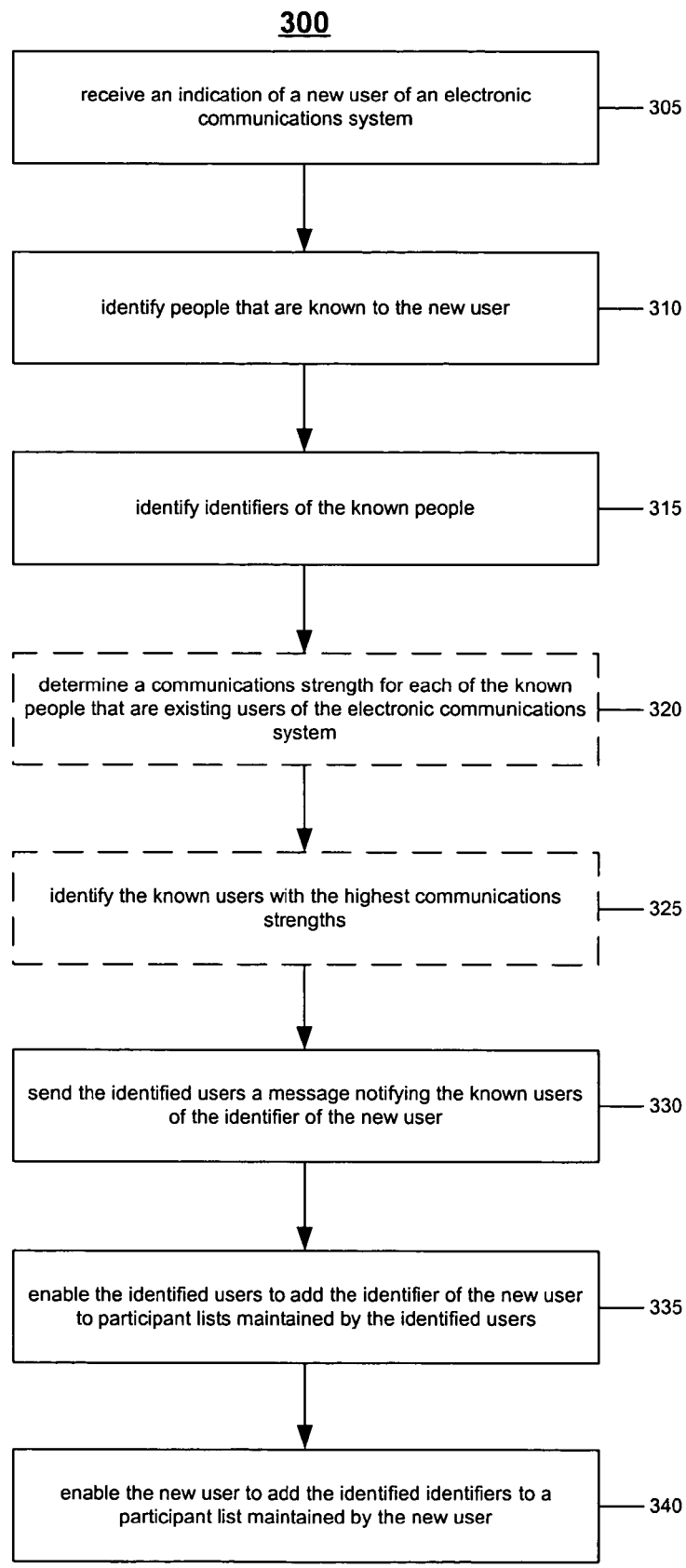
FIG. 3 is a flow chart of a process for announcing a new user of an electronic communications system to existing users of the electronic communications system that are known to the new user.

Referring to FIG. 3, a process 300 is used to announce a new user of an electronic communications system to other users of the electronic communications system that are known to the new user. The process 300 identifies other users of the electronic communications system that are known to the user and notifies the known users that the new user has joined the electronic communications system. In one exemplary implementation, only the known users that have high communications strengths with the new user may be sent notifications. The known users are enabled to add an identifier of the new user to participant lists for the electronic communications system used by the known users. In addition, the new user may be enabled to add identifiers of the known users to which notifications were sent to a participant list used by the new user. The process 300 may be executed when the new user first joins the electronic communications system, or at some time thereafter.

The process 300 begins upon receipt of an indication that there is a new user of the electronic communications system (305). Such an indication may be received, for example, when the new user provides the electronic communications system with personal information, such as a name, address, and phone number, or billing information, such as a credit card or bank account number, that indicates that the new user is joining the electronic communications system. When the new user first joins the electronic communications system, the new user chooses or is assigned an identifier that is used to address messages sent to and from the new user within the electronic communications system. In addition, a participant list may be provided to the new user for use with the electronic communications system. The new user may access identifiers of other users of the electronic communications system that have been added to the participant list to address messages to be sent over the electronic communications system to the other users.

People that are known to the new user are identified (310). The known people may be identified from a contact list that includes contact information for people with whom the new user may communicate, as is done in the process 100 of FIG. 1. Identifiers of the known people are identified (315). Identifying the identifiers of the known people may include directly or indirectly identifying the identifiers from the contact information included in the contact list, as is done in the process 100 of FIG. 1. Identifying an identifier for a known person may indicate that the known person is an existing user of the electronic communications system.

Communications strengths may be determined for each of the known people that is an existing user of the electronic communications system (320). The communications strengths may be calculated from one or more characteristics of the relationship between the new user and each of the existing users, as described above. Alternatively or additionally, the communications strengths may be indicated by the contact list from which the known people was identified, as described above. The known users with high communications strengths may be identified (325). More particularly, the known users with communications strengths above a threshold value that is indicative of a high communications strength may be identified.

The identified users of the electronic communications system may be sent a message that notifies the identified users of the identifier of the new user (330). The previously identified identifiers of the identified users may be used to address the notifications to the identified users. The notification may be sent as a type of message typically sent with the electronic communications system. For example, when the electronic communications system is an instant messaging system, the notifications may be sent as instant messages. As another example, the electronic communications system may be an e-mail system, and the notifications are sent as e-mail messages.

The identified users are enabled to add the identifier of the new user to participant lists used by the identified users (335). In some implementations, the notifications may include an indication of the identifier of the new user and a control that automatically adds the identifier of the new user to the participant lists of the identified users. The control may be a button or a link within the notification that may be selected. In other implementations, the identifier may be added to the participant lists when a response to the notifications is received. For example, when the notifications are sent to the identified users as instant messages, the identifier may be added to the participant lists when affirmative responses to the instant messages are received. In other implementations, the identified users may manually add the identifier to the participant lists when the notifications are received.

The new user is enabled to add the identified identifiers to the participant list that is used by the new user (340). The identifiers may be identified and added to the participant list through execution of the process 100 of FIG. 1. In one implementation, the identifiers of the known people that were sent notifications are added to the participant list. In another implementation, identifiers of all known people are added to the participant list. The new user also may be enabled to manually add the identified identifiers to the participant list.

In some implementations, each of the existing users of the electronic communications system that are known to the new user may use multiple identifiers when communicating over the electronic communications system. The multiple identifiers may be linked such that each of the existing users may communicate using more than one of their multiple identities at a time, and a participant list may be maintained for each of the multiple identities. The participant lists for each of the multiple identities used by an existing user may be conglomerated into a single participant list for the existing user. When an existing user that is known to the new user is enabled to add an identifier of the new user to the single participant list for the existing user, a participant list within the single participant list for the existing user that is appropriate for the addition of the new user may be identified.

Figure 4A:
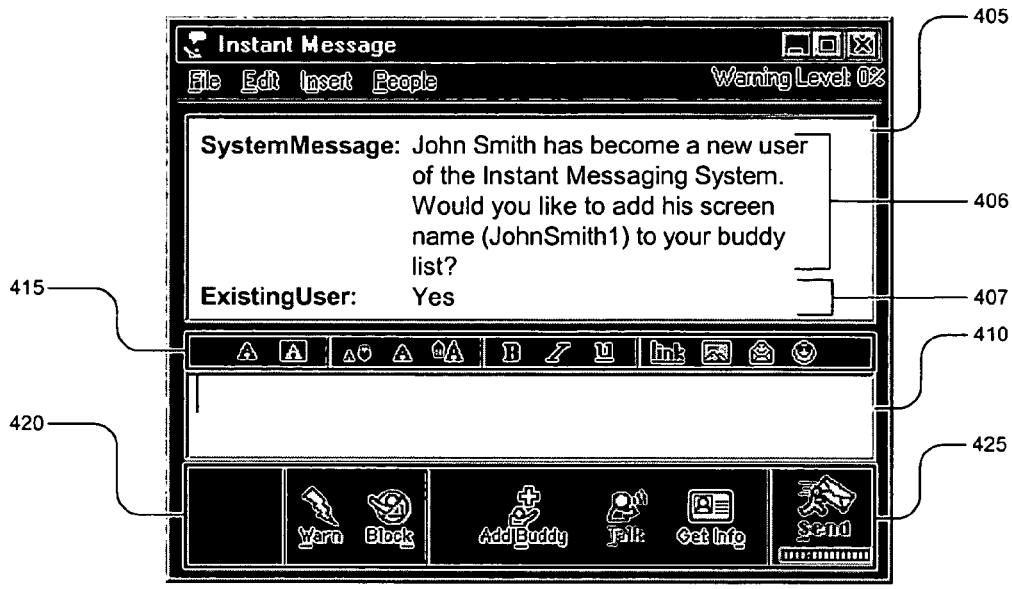
FIGS. 4A and 4B are illustrations of notifications of a new user that are sent to other users.

Referring to FIG. 4A, a message notifying a user of an instant messaging system of an identifier of a new user of the instant messaging system is displayed in an instant messaging interface 400. Instant messages may be sent and received with the instant messaging interface 400. For example, the instant messaging interface 400 may be used to exchange communications with a user whose screen name is displayed on a buddy list interface, such as the buddy list interface 200 of FIG. 2A. After a sender of instant messages is notified that a recipient is present and available to send and receive instant messages, the sender may use the Instant messaging interface 400 to exchange instant messages with the recipient.

The instant messaging interface 400 includes a message history box 405 that lists the instant messages sent between the sender and the recipient. The message history box 405 also may be referred to as a message transcript box 405. Each message is presented with an indication of a screen name by which the sender or the recipient is identified as the sender of the message. Each message listed in the message history box 405 also includes the text of the instant message sent by the sender or the recipient. For example, the message history box 405 includes a message 406 sent by a user with a screen name "SystemMessage" and a message 407 sent by a user with a screen name "ExistingUser." In one implementation, each message listed in the message history box 405 includes a time stamp of when the message was sent. The users that sent the messages 406 and 407 are the recipient and the sender, respectively.

The instant messaging interface 400 also includes a message specification box 410 in which the sender may specify a message to be sent to the recipient. The sender may enter text to be sent to the recipient in the message specification box 410. The instant message interface 400 includes a set of format controls 415 that may be used to format the text entered in the message specification box 410. More particularly, the controls in the set of format controls 415 enable the user to change the size, foreground color, background color, style, and effects of the text entered in the message specification box 410. The set of format controls 415 also includes controls for inserting objects that are not plain text, such as hyperlinks and emoticons, into the message specification box 410.

After a message has been specified in the message specification box 410, the message may be sent by selecting a send button 425 included in a second control set 420. After the send button 425 has been selected, the text that has been entered in the message specification box 410 is sent to the recipient, and the message specification box 410 is cleared. The message is added to the message history box 405. The message also is displayed in a message history box 405 of an instance of the instant messaging interface 400 being viewed by the recipient. Also included in the second control set 420 are controls for warning instant message senders, blocking instant messages from particular senders, or adding the sender to a participant list used by the sender.

The recipient with the screen name "SystemMessage" may be an instant messaging robot that automatically sends notifications of new users to existing users that are known to the new users, and the sender with the screen name "ExistingUser" may be one of those known existing users. The message 406 is a notification of a screen name of a new user of the instant messaging system that knows the sender. For example, the new user is named "John Smith" and has chosen "JohnSmith1" as a screen name to be used to identify himself in the instant messaging system. The message 407 is an affirmative response to the notification message 406. Upon receiving the affirmative response, the recipient (SystemMessage) automatically adds the screen name of the new user to a buddy list maintained for use by the sender (ExistingUser) such that the sender may select the new user's screen name to address instant messages to the new user.

Figure 4B:
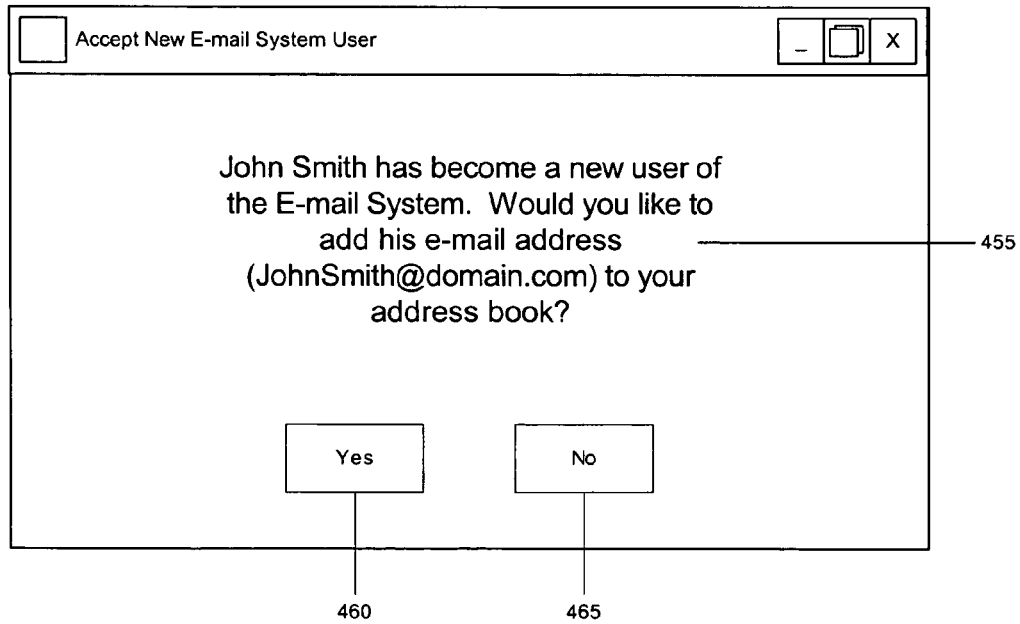

Referring to FIG. 4B, a notification interface 450 notifies an existing user of an electronic communications system, such as an e-mail system, of an identifier of a new user of the electronic communications system, such as an e-mail address of the new user. The notification interface 450 also enables the existing user to import the identifier into a list of contact information, such as an e-mail address book, that is used by the existing user.

The notification interface 450 includes a message 455 that informs the existing user of the identifier of the new user. For example, the message 455 illustrated in FIG. 4B informs the existing user that the new user is a new user of the e-mail system and that the new user's e-mail address is "JohnSmith@domain.com."

The notification interface 450 also includes an accept button 460 that enables the existing user to import the e-mail address of the new user into an e-mail address book used by the existing user. When the existing user selects the accept button 460, the e-mail address of the new user is added to the address book of the existing user. The notification interface 450 also includes a reject button 465 that, when selected, dismisses the notification interface 450 without first adding the e-mail address of the new user to the address book of the existing user.

Referring to FIG. 5A, an exemplary address book 500 may be displayed to a user of an e-mail program. The address book 500 includes a list box 505 that includes a list of the user's contacts. Three contacts, Larry Jones, Bob Davis, and Jane Doe, are shown in the list box 505. When a contact in list box 505 is selected, the contact's information is shown in a box 510. The information includes, for example, the contact's name and the contact's e-mail address. FIG. 5A illustrates the address book 500 before a notification of an e-mail address of a new user, such as the notification interface 450 of FIG. 4B, is displayed for the user.

Referring also to FIG. 5B, the address book 500 also may be displayed to the user after such a notification is displayed. For example, the user, upon being presented with the notification interface 450 of FIG. 4B, may select the accept button 460 to import the e-mail address of the new user into the address book 500, and then may access the address book 500. When the address book 500 is subsequently accessed, the new user appears in the list box 505 as an additional contact 515 named John Smith, as was indicated in the notification interface 450. Selection of the contact 515 displays contact information for the contact 515 in the box 510. For example, the e-mail address 520, "JohnSmith@domain.com," which was indicated on the notification interface 450, is associated with the contact 515 that was added to the address book 500 as a result of the selection of the accept button 460. The contact 515 may be selected from the address book 500 to address messages to the new user. In addition, the new user may have added the user of the address book 500 to an address book used by the new user such that the new user may select the user from the address book to address e-mail messages to the user.

Figure 6:
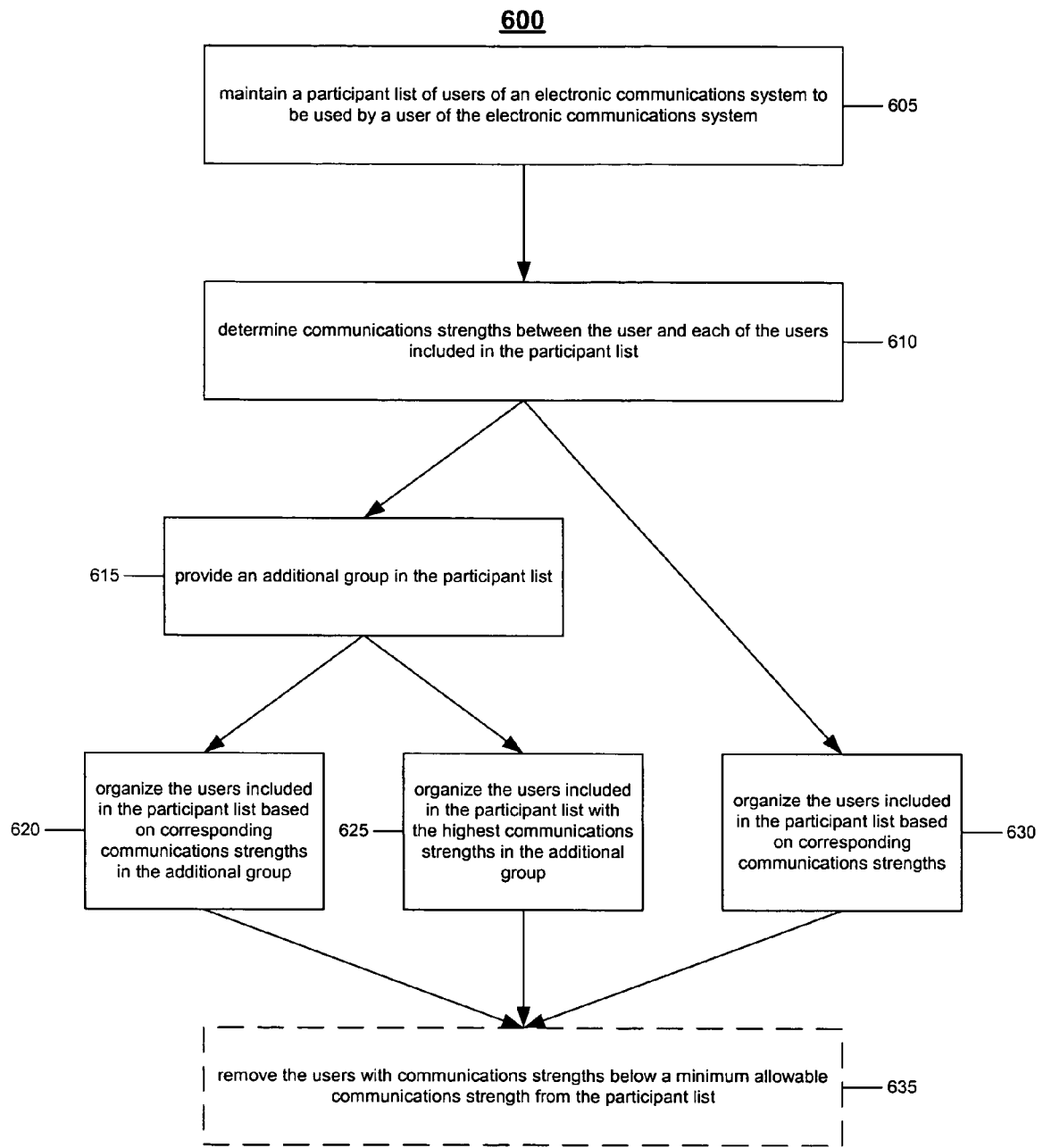
FIG. 6 is a flow chart of a process for organizing entries of a participant list.

Referring to FIG. 6, a process 600 is used to organize a participant list of users of an electronic communications system that is used by a user of the electronic communications system. The users included in the participant list are organized based on communications strengths of the users with the user that uses the participant list. The users may be organized in place in the participant list, or in a special group within the participant list. The special group may only include the users that correspond to the highest communications strengths. In addition, the users that correspond to the lowest communications strengths may be removed from the participant list, because communication with those users is unlikely. The process 600 may be executed when the user first becomes a user of the electronic communications system, periodically on a recurring basis, or after an indication to execute the process 600 is received from the user.

Initially, the participant list used by the user is maintained (605). The user may use the participant list to communicate with the other users included in the participant list. The participant list includes one or more identifiers of the other users, and the user may select an identifier from the participant list to address a message to be sent to the corresponding user with the electronic communications system. The identifiers included in the participant list may be separated into one or more groups that categorize or otherwise organize the other users. The location of the identifier within the participant list may affect how quickly and easily the user may find and select the identifier and send the message.

Communications strengths are determined for each of the users included in the participant list (610). The communications strengths may be calculated from one or more characteristics of the relationship between the new user and each of the known users, as described above.

An additional group within the participant list may be provided (615). Copies of the identifiers of some or all of the users included in the participant list may be organized within the additional group. In one implementation, the additional group is added to the end of the participant list below other existing groups within the participant list. Organizing copies of the identifiers within the additional group does not disrupt the organization of other copies of the identifiers included in other existing groups of the participant list. Therefore, the user may access the unorganized identifiers, with which the user may be more familiar, or the organized identifiers in the additional group when accessing identifiers to address messages to the corresponding users of the electronic communications system.

The users included in the participant list may be organized based on communications strength in the additional group (620). In one implementation, second copies of identifiers of users with higher communications strengths are placed above identifiers of users with lower communications strengths in the additional group. All users included in the participant list are organized within the additional group, so the participant list includes two copies of an identifier of each of the users included in the participant list. Copies of the identifiers in the other existing groups are not organized by communications strength.

Alternatively, only some of the users included in the participant list may be organized based on communications strength in the additional group. For example, the users with the highest communications strengths may be organized in the additional group (625). Identifiers of users with higher communications strengths may be placed above identifiers of users with lower communications strengths in the additional group. In one implementation, identifiers of a particular number of the users with the highest communications strengths are organized within the participant list. In another implementation, identifiers of the users with communications strengths above a threshold value are organized within the additional group. Only some of the users of the participant list are organized within the additional group, so the participant list includes two copies of an identifier of some of the users included in the participant list. Copies of the identifiers in the other existing groups remain unorganized.

When the additional group is not provided within the participant list, the users included in the participant list are organized in place based on corresponding communications strengths (630). Doing so may change the order in which the identifiers of the included users appear in the participant list. Identifiers of users with higher communications strengths may be placed above identifiers of users with lower communications strengths within each group of the participant list. In such implementations, the participant list includes a single copy of each different identifier, and no identifiers are moved or copied between groups.

Identifiers of the users included in the participant list corresponding to the lowest communications strengths may be removed from the participant list (635). For example, identifiers of the users corresponding to communications strengths that are below a threshold value may be removed from the participant list. A low communications strength for a particular user is indicative of a weak relationship between the particular user and the user. As such, the user most likely does not communicate with the particular user very often, and the user most likely does not access an identifier of the particular user included in the participant list to address a message to the particular user very often. Therefore, the identifier of the particular user, and other users included in the participant list corresponding to the lowest communications strengths, may be removed from the participant list. As an alternative to removal, these users may be moved to a special group designated as being for users with lower communications strengths.

In some implementations, the user of the electronic communications system whose participant list is maintained with the process 600 may use multiple identifiers when communicating over the electronic communications system. The multiple identifiers may be linked such that the user may communicate using more than one of the multiple identities at a time. Furthermore, the user may maintain a participant list for each of the multiple identities, and the participant list for a particular identifier may include other users with whom the user communicates using the particular identifier. The participant lists for each of the multiple identities may be conglomerated into a single participant list that is maintained with the process 600.

When organizing the participant list of the user with the process 600, the multiple participant lists corresponding to the user may be organized individually. In addition, an additional participant list may be added to the single participant list for the user. The additional participant list may include one or more users from one or more of the multiple participant lists for the user in an organized manner, in a manner similar to how users of the participant list were organized within an additional group within the participant list (620, 625).

Referring to FIGS. 7A-7C, a buddy list interface 200 for a given user displays in an organized manner the screen names of other selected users of an instant messaging system with which the given user regularly exchanges instant messages. More particularly, the buddy list interfaces 200 illustrated in FIGS. 7A-7C display organized listings of the screen names displayed in the buddy list interface 200 of FIG. 2A. The buddy list interfaces 200 illustrated in FIGS. 7A-7C are presented to the given user after various implementations of the process 600 of FIG. 6 are executed for the given user.

The buddy list interface 200 in FIG. 7A is presented to the given user after the execution of an implementation of the process 600 in which the displayed screen names are organized in place within the buddy groups with which the displayed screen names are associated. The displayed screen names are organized within the buddy list based on communications strength between the corresponding other users and the given user, with screen names corresponding to higher communications strengths appearing within the buddy groups above screen names corresponding to lower communications strengths. In addition, screen names corresponding to exceedingly low communications strengths may be removed from the buddy list.

For example, in the buddy list interface 200 from FIG. 2A, the screen name 210a is listed above the screen name 210b in the buddy group 215a. However, in the buddy list interface 200 of FIG. 7A, the screen name 210b is listed above the screen name 210a in the buddy group 215a because the user corresponding to the screen name 215b has a higher communications strength with the given user than the user corresponding to the screen name 210a. The screen names 210a and 210b are still associated with the buddy group 215a.

Similarly, the screen names 215c, 215d, and 215e are presented within the buddy group 215b in that order in the buddy list 200 of FIG. 2B. However, in the buddy list interface 200 of FIG. 7A, the screen name 210e is listed above the screen name 210c in the buddy group 215b, and the screen name 210d is no longer associated with the buddy group 215b. Such a display of the screen names 210c-210e indicates that the user corresponding to the screen name 210e has the highest communications strength with the given user among the users corresponding to the screen names 210c-210e. The user corresponding to the screen name 210d has a communications strength with the given user that warrants removing the screen name from the buddy list, and the user corresponding to the screen name 210c has a communications strength between the communications strengths corresponding to the screen names 210d and 210e.

Organizing the screen names 210a-210e within the groups with which the screen names 210a-210e are associated indicates the relative communications strengths of the users corresponding to a particular group. However, the relative communications strengths of users whose screen names are associated with different buddy groups are not easily seen with such an organization. Organizing the screen names 210a-210e without reference to a particular buddy group indicates the relative communications strengths of users whose screen names are associated with different buddy groups.

The buddy list interfaces 200 in FIGS. 7B and 7C are presented to the given user after the execution of implementations of the process 600 in which the displayed screen names are organized within a special group in the buddy list based on communications strength. More particularly, all of the screen names displayed in the buddy list interface 200 of FIG. 2A are organized within the special group displayed in the buddy list interface 200 of FIG. 7B, and the screen names corresponding to the highest communications strengths are organized within the special group displayed in the buddy list interface 200 of FIG. 7C. Screen names corresponding to higher communications strengths are displayed within the special group above screen names corresponding to lower communications strengths.

The buddy list interfaces 200 of FIGS. 7B and 7C include a special buddy group 215e, "Organized," that includes some or all of the screen names 210a-210e. The header of the special buddy group 215e indicates that all of the users associated with the special buddy group 215e are present and available to exchange instant messages. In FIG. 7B, the screen name 210e is the first screen name listed in the special group 215e, the screen name 210b is the second, the screen name 210c is the third, the screen name 210a is the fourth, and the screen name 210d is the fifth. In FIG. 7C, only the screen names 210e, 210b, and 210c, are listed within the special group 215e in the same order as in FIG. 7B. The order of appearance of the screen names 210a-210e within the special buddy group 215e is indicative of the relative communications strengths of the users corresponding to the screen names 210a-210e. The screen names 210a-210e remain associated with the buddy groups 215a-215c such that some or all of the screen names 210a-210e are displayed in the buddy list interface 200 twice.

The special buddy group 215e may be placed above, below, or among the other existing buddy groups 215a-215c to facilitate viewing and selecting the organized screen names 210a-210e. In some implementations, the screen names 210a-210e may be selectable from the buddy list interfaces 200 of FIGS. 7A-7C to reveal the communications strengths of the users corresponding to the screen names 210a-210e. For example, selecting one of the screen names 210a-210e may cause a tool tip or some other pop-up window to be displayed with an indication of the communications strength of the user corresponding to the selected screen name. The indication of the communications strength may be a numerical value for the communications strength or a more qualitative description of the communications strength.

The described techniques for augmenting and organizing participant lists of identifiers used in sending and receiving electronic messages may be applied to any type of participant list associated with any type of electronic communications system. For example, a buddy list used with an instant messaging system, an e-mail address book used with an e-mail system, a list of users of a social network used with a social networking system, or any other list of contact information that includes information that may be used to contact other people, may be automatically augmented with contact information of known people. The same contact lists may be organized to facilitate accessing and selecting contact information that may be used to contact other people.

Figure 8:
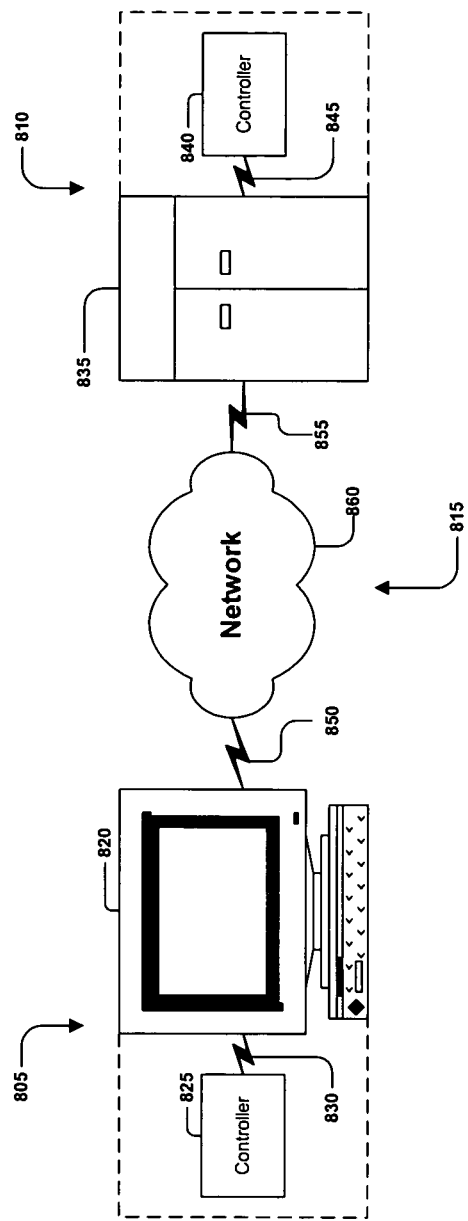
FIG. 8 is a block diagram of a communications system.
Figure 9:
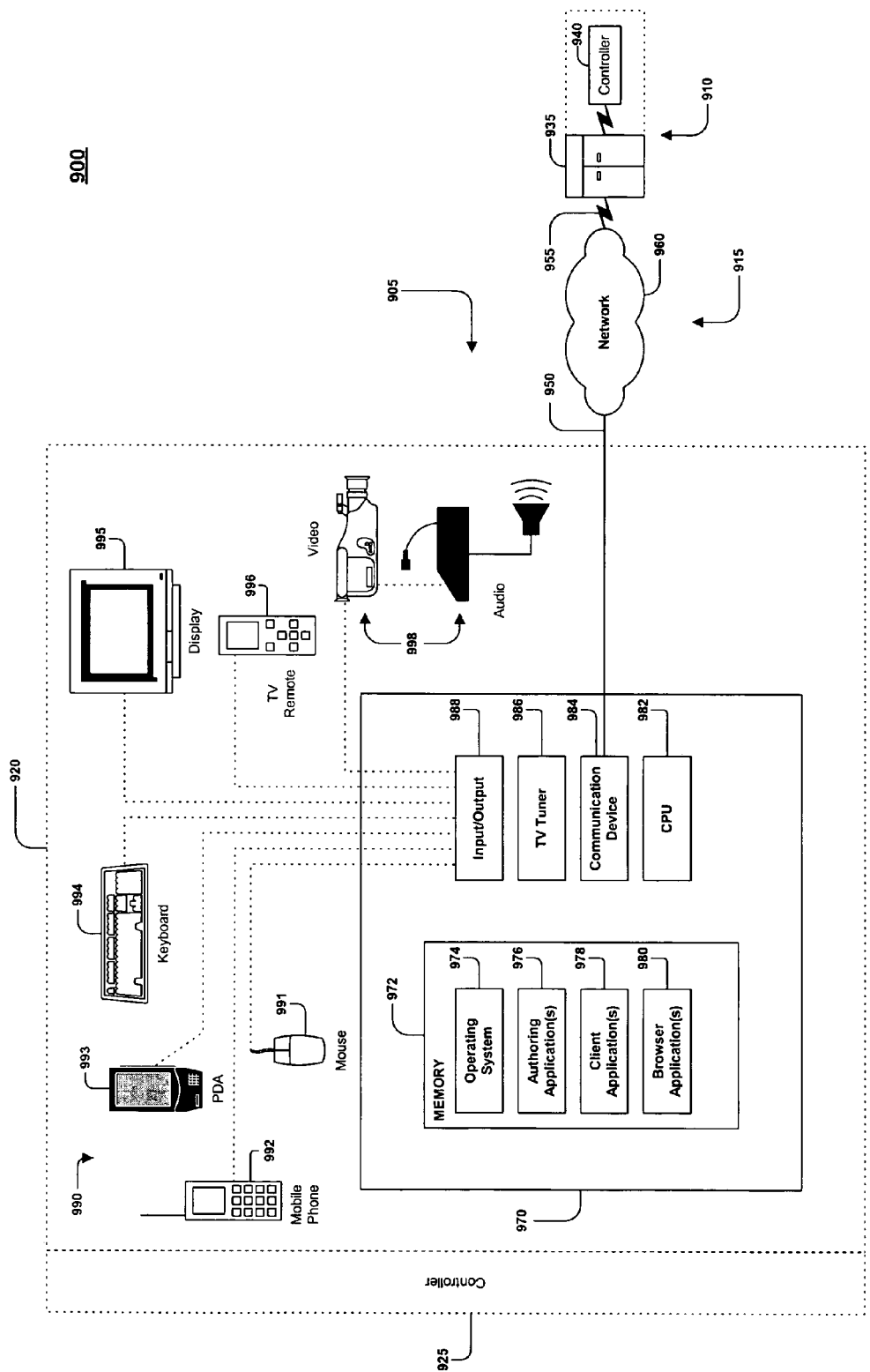
FIGS. 9 and 10 are expansions of the block diagram of FIG. 8.
Figure 10:
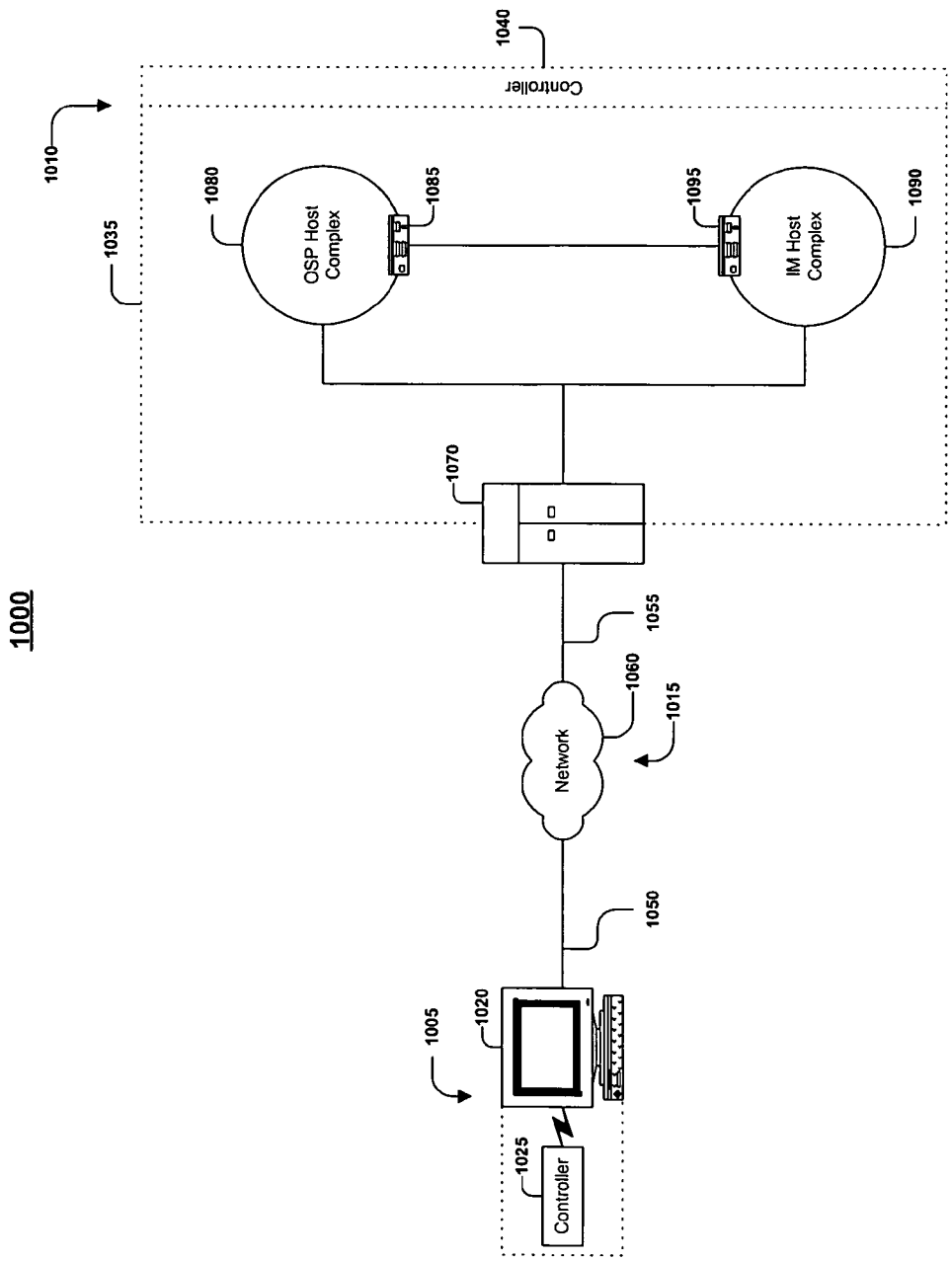

FIGS. 8-10 illustrate exemplary block diagrams of an electronic communications system that may be used as part of the implementation of the features described above.

For illustrative purposes, FIGS. 8-10 show an example of a communications system for implementing techniques for transferring electronic data, including instant messages and e-mail. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 8, a communications system 800 is capable of delivering and exchanging data between a user system 805 and a provider system 810 through a communications link 815. The user system 805 typically includes one or more user devices 820 and/or user controllers 825, and the provider system 810 typically includes one or more provider devices 835 and/or provider controllers 840. For example, the user system 805 or the provider system 810 may include one or more general-purpose computers (e.g., personal computers), one or more special-purpose computers (e.g., devices specifically programmed to communicate with each other and/or the user system 805 or the provider system 810), or a combination of one or more general-purpose computers and one or more special-purpose computers. The user system 805 and the provider system 810 may be arranged to operate within or in concert with one or more other systems, such as, for example, one or more LANs ("Local Area Networks") and/or one or more WANs ("Wide Area Networks").

The user device 820 (or the provider device 835) is generally capable of executing instructions under the command of a user controller 825 (or a provider controller 840). The user device 820 (or the provider device 835) is connected to the user controller 825 (or the provider controller 840) by a wired or wireless data pathway 830 or 845 capable of delivering data.

Each of the user device 820, the user controller 825, the provider device 835, and the provider controller 840 typically includes one or more hardware components and/or software components. An example of a user device 820 or a provider device 835 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The user device 820 and the provider device 835 may include devices that are capable of peer-to-peer communications.

An example of a user controller 825 or a provider controller 840 is a software application loaded on the user device 820 or the provider device 835 for commanding and directing communications enabled by the user device 820 or the provider device 835. Other examples include a program, a piece of code, an instruction, a device, a computer, a computer system, or a combination thereof, for independently or collectively instructing the user device 820 or the provider device 835 to interact and operate as described. The user controller 825 and the provider controller 840 may be embodied permanently or temporarily in any type of machine, component, physical or virtual equipment, storage medium, or propagated signal capable of providing instructions to the user device 820 or the provider device 835.

The communications link 815 typically includes a delivery network 860 making a direct or indirect communication between the user system 805 and the provider system 810, irrespective of physical separation. Examples of a delivery network 860 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 815 may include communication pathways 850 and 855 that enable communications through the one or more delivery networks 860 described above. Each of the communication pathways 850 and 855 may include, for example, a wired, wireless, cable or satellite communication pathway.

FIG. 9 illustrates a communications system 900 including a user system 905 communicating with a provider system 910 through a communications link 915. User system 905 typically includes one or more user devices 920 and one or more user controllers 925 for controlling the user devices 920. Provider system 910 typically includes one or more provider devices 935 and one or more provider controllers 940 for controlling the provider devices 935. The communications link 915 may include communication pathways 950 and 955 that enable communications through the one or more delivery networks 960.

Examples of each element within the communications system of FIG. 9 are broadly described above with respect to FIG. 8. In particular, the provider system 910 and communications link 915 typically have attributes comparable to those described with respect to the provider system 810 and the communications link 815 of FIG. 8. Likewise, the user system 905 of FIG. 9 typically has attributes comparable to and illustrates one possible implementation of the user system 805 of FIG. 8.

The user device 920 typically includes a general-purpose computer 970 having an internal or external storage 972 for storing data and programs such as an operating system 974 (e.g., DOS, Windows™, Windows 95™, Windows 98™, Windows 2000™, Windows Me™, Windows XP™, Windows NT™, OS/9, or Linux) and one or more application programs. Examples of application programs include authoring applications 976 (e.g., word processing programs, database programs, spreadsheet programs, or graphics programs) capable of generating documents or other electronic content; user applications 978 (e.g., AOL user, CompuServe user, AIM user, AOL TV user, or ISP user) capable of communicating with other computer users, accessing various computer resources, and viewing, creating, or otherwise manipulating electronic content; and browser applications 980 (e.g., Netscape's Navigator or Microsoft's Internet Explorer) capable of rendering standard Internet content and also capable of supporting a web-based e-mail user and a web-based instant messaging user.

The general-purpose computer 970 also includes a central processing unit 982 (CPU) for executing instructions in response to commands from the user controller 925. In one implementation, the user controller 925 includes one or more of the application programs installed on the internal or external storage 972 of the general-purpose computer 970. In another implementation, the user controller 925 includes application programs externally stored in and performed by one or more device(s) external to the general-purpose computer 970.

The general-purpose computer typically will include a communication device 984 for sending and receiving data. One example of the communication device 984 is a modem. Other examples include a transceiver, a set-top box, a communication card, a satellite dish, an antenna, or another network adapter capable of transmitting and receiving data over the communications link 915 through a wired or wireless data pathway 950. The general-purpose computer 970 also may include a TV tuner 986 for receiving television programming in the form of broadcast, satellite, and/or cable TV signals. As a result, the user device 920 can selectively and/or simultaneously display network content received by communications device 984 and television programming content received by the TV tuner 986.

The general-purpose computer 970 typically will include an input/output interface 988 for wired or wireless connection to various peripheral devices 990. Examples of peripheral devices 990 include, but are not limited to, a mouse 991, a mobile phone 992, a personal digital assistant 993 (PDA), an MP3 player (not shown), a keyboard 994, a display monitor 995 with or without a touch screen input, a TV remote control 996 for receiving information from and rendering information to subscribers, and an audiovisual input device 998.

Although FIG. 9 illustrates devices such as a mobile telephone 992, a PDA 993, and a TV remote control 996 as being peripheral with respect to the general-purpose computer 970, in another implementation, such devices may themselves include the functionality of the general-purpose computer 970 and operate as the user device 920. For example, the mobile phone 992 or the PDA 993 may include computing and networking capabilities and function as a user device 920 by accessing the delivery network 960 and communicating with the provider system 910. Furthermore, the user system 905 may include one, some or all of the components and devices described above.

Referring to FIG. 10, a communications system 1000 is capable of delivering and exchanging information between a user system 1005 and a provider system 1010 through a communication link 1015. User system 1005 typically includes one or more user devices 1020 and one or more user controllers 1025 for controlling the user devices 1020. Provider system 1010 typically includes one or more provider devices 1035 and one or more provider controllers 1040 for controlling the provider devices 1035. The communications link 1015 may include communication pathways 1050 and 1055 that enable communications through the one or more delivery networks 1060.

Examples of each element within the communications system of FIG. 10 are broadly described above with respect to FIGS. 8 and 9. In particular, the user system 1005 and the communications link 1015 typically have attributes comparable to those described with respect to user systems 805 and 905 and communications links 815 and 915 of FIGS. 8 and 9. Likewise, the provider system 1010 of FIG. 10 may have attributes comparable to and illustrates one possible implementation of the provider systems 810 and 910 shown in FIGS. 8 and 9.

The provider system 1010 includes a provider device 1035 and a provider controller 1040. The provider controller 1040 is generally capable of transmitting instructions to any or all of the elements of the provider device 1035. For example, in one implementation, the provider controller 1040 includes one or more software applications loaded on the provider device 1035. In other implementations, as described above, the provider controller 1040 may include any of several other programs, machines, and devices operating independently or collectively to control the provider device.

The provider device 1035 includes a login server 1070 for enabling access by subscribers and for routing communications between the user system 1005 and other elements of the provider device 1035. The provider device 1035 also includes various provider complexes such as the depicted OSP ("Online Service Provider") provider complex 1080 and IM ("Instant Messaging") provider complex 1090. To enable access to these provider complexes by subscribers, the user system 1005 includes communication software, for example, an OSP user application and an IM user application. The OSP and IM communication software applications are designed to facilitate the subscriber's interactions with the respective services and, in particular, may provide access to all the services available within the respective provider complexes.

Typically, the OSP provider complex 1080 supports different services, such as e-mail, discussion groups, chat, news services, and Internet access. The OSP provider complex 1080 is generally designed with an architecture that enables the machines within the OSP provider complex 1080 to communicate with each other and employs certain protocols (i.e., standards, formats, conventions, rules, and structures) to transfer data. The OSP provider complex 1080 ordinarily employs one or more OSP protocols and custom dialing engines to enable access by selected user applications. The OSP provider complex 1080 may define one or more specific protocols for each service based on a common, underlying proprietary protocol.

The IM provider complex 1090 is generally independent of the OSP provider complex 1080, and supports instant messaging services irrespective of a subscriber's network or Internet access. Thus, the IM provider complex 1090 allows subscribers to send and receive instant messages, whether or not they have access to any particular ISP. The IM provider complex 1090 may support associated services, such as administrative matters, advertising, directory services, chat, and interest groups related to instant messaging. The IM provider complex 1090 has an architecture that enables all of the machines within the IM provider complex to communicate with each other. To transfer data, the IM provider complex 1090 employs one or more standard or exclusive IM protocols.

The provider device 1035 may include one or more gateways that connect and therefore link complexes, such as the OSP provider complex gateway 1085 and the IM provider complex gateway 1095. The OSP provider complex gateway 1085 and the IM provider complex gateway 1095 may directly or indirectly link the OSP provider complex 1080 with the IM provider complex 1090 through a wired or wireless pathway. Ordinarily, when used to facilitate a link between complexes, the OSP provider complex gateway 1085 and the IM provider complex gateway 1095 are privy to information regarding the protocol type anticipated by a destination complex, which enables any necessary protocol conversion to be performed incident to the transfer of data from one complex to another. For instance, the OSP provider complex 1080 and IM provider complex 1090 generally use different protocols such that transferring data between the complexes requires protocol conversion by or at the request of the OSP provider complex gateway 1085 and/or the IM provider complex gateway 1095.

The described techniques result in the population and organization of participant lists for electronic communications systems. Presence and location of a user in a participant list is indicative of the communications strength of the user with another user that uses the participant list. As a result, participant lists populated and organized with the described techniques may inform the population and organization of other participant lists. For example, when a buddy list of an instant messaging system is organized with the process 600 of FIG. 6, the organization of contacts within the buddy list may be used to organize the same contacts in an address book for an e-mail system. The e-mail system may receive the participant list from the instant messaging system as a result of subscribing to participant lists published by the instant messaging system. Furthermore, applications and systems related or unrelated to a participant list that has been populated or organized with the described techniques may use the participant list. For example, an application may need to communicate with a person well known to a user whose participant list was populated with the process 100 of FIG. 1. The application may identify such a person from the participant list because people with high communications strengths with the user have been added to the user's participant list.

In another example, when a buddy list of an instant messaging system is populated using the process 100 of FIG. 1 and/or organized using the process 600 of FIG. 6, the populated and/or organized buddy list may be accessed by and/or exported to other instant messaging systems or other systems that provide a user interface for an instant messaging system. Thus, a buddy list that is populated and/or organized in one instant messaging system may be accessed, used, and/or exported for use by a different instant messaging system.

The described techniques may be applied when a user first becomes a user of an electronic communications system, at which point the user receives a new personal identifier and a corresponding participant list for use with the electronic communications system. The described techniques also may be applied when the user changes their identifier, or when the user chooses an additional identifier. For example, people known to the user may be notified of the changed or additional identifier such that those people may add the changed or additional identifier to their personal participant lists. People known to the user may be added to participant lists corresponding to the changed or additional identifier, and the participant lists corresponding to the changed or additional identifier may be organized. Population and organization of the participant lists for the changed or additional identifier may occur separately for each of those participant lists, or together for all of the participant lists corresponding to the user, as described above.

A participant list of a user of an electronic communications system may be dynamically maintained by calculating communications strengths between the user and people known to the user multiple times on a periodic or aperiodic basis. As messages are sent and received by the user, and as the relationships between the users and the known people change, the communications strengths between the user and the known people may change, and the communications strengths may be calculated multiple times to account for that change. For example, the communications strength between the user and one of the known people may be calculated each time a message is sent to or from that known person. The population and organization of the participant list of the user may be updated according to the process 100 of FIG. 1 and the process 600 of FIG. 6, based on the latest calculations of the communications strengths that have been received. In addition, people known to the user may be enabled to add an identifier of the user to a personal participant list according to the process 300 of FIG. 3, based on the latest calculations of the communications strengths that have been received.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for announcing new users of an electronic communications system, the method comprising:
   receiving an indication of a new user of an electronic communications system;
   accessing, from a computer memory storage system, contact information that is maintained on behalf of the new user and that includes contact information for other users;
   based on the accessed contact information, identifying multiple users who are known by the new user;
   as a consequence of identifying the users who are known by the new user, comparing the users identified as being known by the new user to data maintained on behalf of the electronic communications system that includes information about existing users of the electronic communications system who previously registered with the electronic communications system;
   based on results of comparing the users identified as being known by the new user to the data maintained on behalf of the electronic communications system that includes information about existing users of the electronic communications system who previously registered with the electronic communications system, determining that at least some of the users identified as being known by the new user are existing users of the electronic communications system who previously registered with the electronic communications system; and
   as a consequence of determining that at least some of the users identified as being known by the new user are existing users of the electronic communications system, sending, to at least one of the users who was identified as being known by the new user and who was determined to be an existing user of the electronic communications system, a message notifying the at least one user who was identified as being known by the new user and who was determined to be an existing user of the electronic communications system that the new user also is a user of the electronic communications system.

2. The computer-implemented method of claim 1 wherein:
   an identifier is associated with the new user; and
   the method further comprises enabling the identified existing users to add the identifier of the new user to participant lists used by the identified existing users.

3. The computer-implemented method of claim 1 further comprising enabling the new user to add identifiers of the identified existing users to a participant list of the electronic communications system used by the new user.

4. The computer-implemented method of claim 3 further comprising determining the identifiers of the identified existing users.

5. The computer-implemented method of claim 1 wherein identifying multiple users who are known by the new user comprises identifying identifiers of the electronic communications system that correspond to users who are know by the new user.

6. The computer-implemented method of claim 1 wherein identifying multiple users who are known by the new user comprises identifying users for whom contact information is included in the contact information maintained on behalf of the new user.

7. The computer-implemented method of claim 1 wherein identifying multiple users who are known by the new user comprises identifying users who include contact information for the new user in contact information maintained on their behalf and for whom contact information is included in the contact information maintained on behalf of the new user.

8. The computer-implemented method of claim 1 wherein identifying multiple users who are known by the new user comprises identifying users of the electronic communications system who are less than a maximum allowable number of degrees of separation away from the new user.

9. The computer-implemented method of claim 1 wherein identifying multiple users who are known by the new user comprises identifying multiple users of the electronic communications system with which the new user has exchanged more than a threshold number of messages.

10. The computer-implemented method of claim 1 wherein identifying multiple users who are known by the new user comprises identifying users of the electronic communications system who have exchanged messages with the new user at a frequency that exceeds a threshold frequency.

11. The computer-implemented method of claim 1 wherein identifying multiple users who are known by the new user comprises identifying users of the electronic communications system who are subscribers to contact information of the new user or publishers of contact information to which the new user subscribes.

12. The computer-implemented method of claim 1 wherein identifying multiple users who are known by the new user comprises identifying users of the electronic communications system who have exchanged messages with the new user in a chat room at a frequency that exceeds a threshold frequency.

13. The computer-implemented method of claim 1 wherein identifying multiple users who are known by the new user comprises identifying users of the electronic communications system who have exchanged messages with the new user for longer than a threshold amount of time.

14. The computer-implemented method of claim 1 wherein identifying multiple users who are known by the new user comprises identifying users of the electronic communications system for which the new user holds an amount of contact information that exceeds a threshold amount, or who hold the an amount of contact information for the new user that exceeds the threshold amount.

15. The computer-implemented method of claim 1 wherein identifying multiple users who are known by the new user comprises identifying users of the electronic communications system who both send messages to the new user and receive messages from the new user.

16. The computer-implemented method of claim 1 wherein identifying multiple users who are known by the new user comprises identifying users of the electronic communications system who have a communications strengths with a different user that exceeds a threshold communications strength.

17. The computer-implemented method of claim 1 wherein the contact information that is maintained on behalf of the new user is a buddy list of an instant messaging system.

18. The computer-implemented method of claim 1 wherein the contact information that is maintained on behalf of the new user is an address book of an e-mail system.

19. The computer-implemented method of claim 1 wherein the contact information that is maintained on behalf of the new user is a social network of the user.

20. The computer-implemented method of claim 1 wherein the electronic communications system is an instant messaging system.

21. The computer-implemented method of claim 1 wherein the message notifying the at least one user who was identified as being known by the new user and who was determined to be an existing user of the electronic communications system that the new user also is a user of the electronic communications system is an instant message.

22. The computer-implemented method of claim 1 wherein the electronic communications system is a chat system.

23. The computer-implemented method of claim 1 wherein the electronic communications system is an e-mail system.

24. The computer-implemented method of claim 1 wherein the message notifying the at least one user who was identified as being known by the new user and who was determined to be an existing user of the electronic communications system that the new user also is a user of the electronic communications system is an e-mail message.

25. A non-transitory, machine-accessible storage medium storing instructions that when accessed, result in a machine performing operations for announcing new users of an electronic communications system, comprising:
  receiving an indication of a new user of an electronic communications system;
  accessing, from a computer memory storage system, contact information that is maintained on behalf of the new user and that includes contact information for one or more other users;
  based on the accessed contact information, identifying multiple users who are known by the new user;
  as a consequence of identifying the users who are known by the new user, comparing the users identified as being known by the new user to data maintained on behalf of the electronic communications system that includes information about existing users of the electronic communications system who previously registered with the electronic communications system;
  based on results of comparing the users identified as being known by the new user to the data maintained on behalf of the electronic communications system that includes information about existing users of the electronic communications system who previously registered with the electronic communications system, determining that at least some of the users identified as being known by the new user are existing users of the electronic communications system who previously registered with the electronic communications system; and
  as a consequence of determining that at least some of the users identified as being known by the new user are existing users of the electronic communications system, sending, to at least one of the users who was identified as being known by the new user and who was determined to be an existing user of the electronic communications system, a message notifying the at least one user who was identified as being known by the new user and who was determined to be an existing user of the electronic communications system that the new user also is a user of the electronic communications system.

26. A system for announcing new users of an electronic communications system, the system comprising:
a memory device storing instructions for announcing new users of an electronic communications system; and
a processing device configured to execute the instructions to perform the steps of:
receiving an indication of a new user of an electronic communications system;
accessing, from a computer memory storage system, contact information that is maintained on behalf of the new user and that includes contact information for one or more other users;
identifying multiple users who are known by the new user based on the accessed contact information;
comparing, as a consequence of identifying the users who are known by the new user, the users identified as being known by the new user to data maintained on behalf of the electronic communications system that includes information about existing users of the electronic communications system who previously registered with the electronic communications system;
determining, based on results of comparing the users identified as being known by the new user to the data maintained on behalf of the electronic communications system that includes information about existing users of the electronic communications system who previously registered with the electronic communications system, that at least some of the users identified as being known by the new user are existing users of the electronic communications system who previously registered with the electronic communications system; and
sending, to at least one of the users who was identified as being known by the new user and who was determined to be an existing user of the electronic communications system and as a consequence of determining that at least some of the users identified as being known by the new user are existing users of the electronic communications system, a message notifying the at least one user who was identified as being known by the new user and who was determined to be an existing user of the electronic communications system that the new user also is a user of the electronic communications system.

27. The computer-implemented method of claim 6 wherein identifying multiple users who are known by the new user comprises inferring that the users are known by the new user based on the contact information for the users being included within the contact information maintained on behalf of the new user.

* * * * *